United States Patent [19]

Yajima et al.

[11] Patent Number: 5,847,857

[45] Date of Patent: Dec. 8, 1998

[54] IMAGE FORMING APPARATUS HAVING REAL TIME PRIORITY DETERMINING MEANS

[75] Inventors: Shunsuke Yajima, Yamatokoriyama; Katsutoshi Ishikawa, Nara; Kouichi Murakami, Yamatokoriyama, all of Japan

[73] Assignee: Sharp Kabushiki Kaisha, Osaka, Japan

[21] Appl. No.: 749,011

[22] Filed: Nov. 14, 1996

[30] Foreign Application Priority Data

Nov. 14, 1995 [JP] Japan ..................................... 7-295258
Dec. 4, 1995 [JP] Japan ..................................... 7-315639

[51] Int. Cl.$^6$ ....................................................... H04N 1/32
[52] U.S. Cl. .......................... 358/468; 358/296; 358/401; 358/434
[58] Field of Search ................................... 358/296, 442, 358/443, 444, 448, 468, 434, 401

[56] References Cited

U.S. PATENT DOCUMENTS 4,797,706  1/1989  Sugishima et al. ...................... 358/300
4,947,345  8/1990  Paradise et al. ......................... 358/442
5,377,016 12/1994  Kashiwagi et al. ..................... 358/403
5,506,657  4/1996  Ito et al. .................................. 358/442
5,535,009  7/1996  Hansen .................................... 358/296

FOREIGN PATENT DOCUMENTS 4408355  10/1994  Germany .
1286017  11/1989  Japan .
3154089   7/1991  Japan .
4233028   8/1992  Japan .
5130311   6/1993  Japan .

Primary Examiner—Peter S. Wong
Assistant Examiner—Derek J. Jardieu

[57] ABSTRACT

A digital copying machine including a scanner section for reading an image of a document and a printer section for printing on a sheet copy data obtained by the scanner section. The copying machine is connected via a communication line with a plurality of external terminals, for example, a personal computer or a facsimile apparatus. The digital copying machine is adapted to receive external data transferred from any one of the external terminals during the printing operation in copy mode for recording the image of the document, and to utilize a suspended period of the printer section for effecting the printout of the external data thus received.

16 Claims, 18 Drawing Sheets

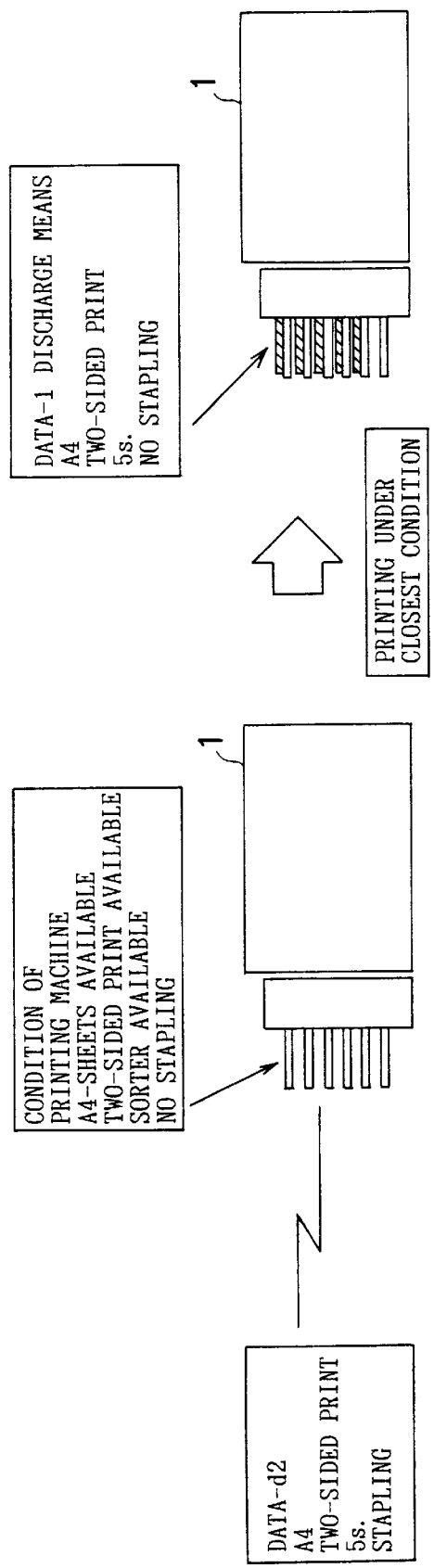

IMAGE FORMING APPARATUS HAVING REAL TIME PRIORITY DETERMINING MEANS

BACKGROUND OF THE INVENTION

1. Field of the Invention

The present invention relates to an image forming apparatus adapted to print data obtained by reading an image of a document on a sheet, in particularly digitized data. More particularly the image forming apparatus is capable of printing and processing external data sent from an external terminal, as required, in addition to the printing of the read data by using image forming means intrinsically provided in the image forming apparatus, particularly a printing means.

2. Description of the Related Art

A digital copying machine, has recently been put on a market as a complex machine featuring functions such as a print mode, a FAX (facsimile) mode, a duplication (copy) mode wherein data is obtained by reading an image of a document and data thus obtained is printed as copy data on a sheet.

Accordingly, the machine is not only capable of operating as a copying machine, but also of printing image data transferred via facsimile communication or external data transferred from an external terminal such as a host computer, a personal computer and a word processor. This leads to a higher operating efficiency of a printer section serving as image forming means. That is, the machine accomplishes a higher operating efficiency of the printer section than a copying machine only functioning to read an image of a document and print the read data on a sheet.

The digital copying machine comprises a scanner section for reading an image of a document, and a printer section for storing copy data and printing the copy data thus stored. The copy data being obtained by processing data read by the scanner section, the copying machine further comprising an input/output interface section for processing external data supplied by the external terminal described above, such as the word processor, the personal computer. Thus, in addition to printing data obtained by reading an image of a document, the machine is capable of receiving external data from the external terminal to print the external data when the printer section is in a standby state (a state where the printer section is not executing a printing operation) or when the printer section is not carrying out a sequence of operation for printing copy data.

As the prior art digital copying machine described above, Japanese Unexamined Patent Publication JP-A 5-130311 (1993) discloses an art by which an image of a document is read and external data requested by other external terminal is printed by utilizing the printer section for printing the image. It is arranged such that when the printer section is not operating, the image (external) data transferred from the external terminal is printed to heighten the operating efficiency of the printer section.

A brief description will be made on the art disclosed in JP-A 5-130311. In order to share a printer section of a digital copying machine 1000 connected to the external terminal 1001 via a communication line 1014, as shown in FIG. 19, an external apparatus 1001 checks an operation state of the printer section of the copying machine 1000 when a printout request is entered to the CPU 1010 from any one of a filing function section 1005, a facsimile function section 1006 and laser beam printer function section 1007. In the case where the printer section is available or is not operating, image data from the function section which has made the request is transferred via an output selector 1009 and a selector 1002 to the copying machine 1000 for the printout of the image. Image data is supplied to any of the function sections 1005 through 1007 from a facsimile apparatus or a personal computer via an external interface 1011 and then transferred via an input selector 1008 to the facsimile function section 1006 or the laser beam printer function section 1007 for storage. Upon the CPU 1010 receiving the request for printing, the external apparatus 1001 transfers the data of the facsimile function section 1006 or the laser beam printer section 1007 to the printer section of the copying machine 1000 in the manner described above for the printout of the data.

Therefore, in JP-A 5-130311, a priority order of printouts of external data transferred from the external terminals is previously set so that printing operation is executed in accordance with the priority order of printing thus set. For example, when external data placed at the highest priority such as from a facsimile machine transferred while the printer section is printing other data, the ongoing printing operation is interrupted for printing the external data from the facsimile machine.

Furthermore, in Japanese Unexamined Patent Publication JP-A 4-233028 (1992), external terminals are intrinsically assigned with a predetermined order of priority for printing out external data transferred from the external terminal. Otherwise, the image forming apparatus assigns the order of priority to external data in the order of the receipt thereof. Thus, the external data is printed in accordance with the order of priority.

The arrangement as described above is effective for improving the operating efficiency of the printer section of the digital copying machine 1000. More specifically, in the case where a request for printing image data is issued from another external terminal when the printer section is in a standby state or not operating, the printer section can be actuated for an efficient utilization of the digital copying machine.

According to the art disclosed in the JP-A 5-130311, however, the arrangement is made such that a priority is given to the printout of data from a facsimile machine, and therefore, the printout of the external data from the other external terminal such as the word processor or the personal computer is put off. Hence, a further improvement of the operating efficiency of the printer section cannot be achieved because a priority is given only to data from a given facsimile machine precedes without determining an order of priority in consideration of the data from the other external terminals.

Furthermore, the art disclosed in JP-A 4-233028 also fails to achieve a substantial improvement in the operating efficiency of the printer section because the external data is printed in an order of the receipt but an order of priority is not set among the external data from the external terminals.

In particular, in the case where the external data is printed in the order of receipt, when the external data is set to printing conditions to which the image forming apparatus cannot immediately respond, the printing operation is not started until the image forming apparatus are set to such conditions. This reduces the operating efficiency of the printer section. Consequently, printing all the external data takes such a quantity of time that the image forming apparatus becomes unable to operate as the copying machine.

For eliminating these problems, the printing speed of the printer section may be increased to reduce the time period required for printing all the external data. Unfortunately however, the increased printing speed will entail more serious problems such as a noise and a shorter service life of components which results in an increased cost.

SUMMARY OF THE INVENTION

It is a first object of the invention to provide an image forming apparatus comprising printing means which is capable of obtaining data by reading an image of a document and printing the read data on a sheet, wherein an operating efficiency of the printing means can be further improved. The invention is particularly directed to improving the operating efficiency of the printing means in such a manner that when image forming means or the printing means is continuously operated, image data from an external terminal or external data to be printed is not printed but a timing at which a continuous operation of the printing means cannot be carried out is detected whereby an operation for printing the image data from the external terminal is started at the timing thus detected.

Furthermore, it is a second object of the invention to provide an image forming apparatus which is capable of further improving the operating efficiency of the printing means without increasing the printing speed thereof. The invention is particularly directed to improving the operating efficiency of the printing means for reducing printout time in such a manner that the external data from external terminals is temporarily stored, an order of printing priority is set among the external data and thereafter the printing operation is executed in accordance with the priority order. The invention is further directed to improving the operating efficiency of the printing means in such a manner that when the external data is transferred from the external terminal during the operation of the printing means, the priority order is reset among the external data so transferred and the other external data yet to be printed. In short, the second object of the invention is to improve the operating efficiency of the printing means as a component of the image forming apparatus by operating the printing means according to the order of the printing priority while minimizing a suspension state of the printing means to improve the operating efficiency as a whole.

The invention provides an image forming apparatus which is used in connection with an external terminal for transferring external data to be printed and is provided with reading means for reading an image of a document at a predetermined reading position and printing means for printing the data read by the reading means as copy data on a sheet whereby the external data transferred from the external terminal can be printed on the sheet with the printing means as required, the apparatus comprising:

control means for allowing the printing means to carry out a printing operation for printing the external data instead of printing copy data read and obtained by the reading means from the beginning of a suspended period in which the printing means cannot carry out the printing operation of printing the copy data continuously by detecting such beginning of the suspended period upon the external data being transferred from the external terminal in a state in which a series of printing operation is carried our for printing on a sheet the copy data by the printing means.

According to the invention, the printing operation of the printing means is temporarily suspended during the suspended period which is utilized for printing the external data from the external terminal so that the operating efficiency of the printing means is notably improved.

Furthermore, the invention is characterized in that the image forming apparatus includes discharge means for separating sheets containing the copy data recorded therein from sheets containing the external data therein, thereby discharging the sheets to respective discharge trays.

According to the invention, sheets containing data recorded therein are classified and discharged so that the sheets can be easily classified and collected.

Furthermore, the invention is characterized in that the document can be arranged at the reading position of the reading means either manually or automatically;

the image forming apparatus includes image processing means for image processing data read by the reading means to provide the copy data;

wherein the suspended period refers to at least one of the following periods, a period required for replenishing sheets to be printed, a period required for changing document when a plurality of documents are sequentially arranged at the reading position by hand, a period required for reading an image of a document and image processing the data thus read, a period required for removing troubles occurred in the reading means, and a period required for removing trouble occurred in the transport of a document when the document is automatically fed to the reading position.

According to the invention, the printing operation of the printing means is not forcibly stopped. In the suspended period during which the printout (copy mode) of the copy data cannot be continued, the printing means temporarily suspends the operation with the result that the operating efficiency of the printing means can be largely improved when the external data is recorded from the external apparatus by using the period.

Furthermore, the invention is characterized in that a plurality of the external terminals are provided for transferring the external data accompanied by condition data indicating the printing condition of the external data, and when the plurality of external terminals transfer the respective external data and the condition data during a sequence of the printing operation, the control means selects from the condition data thus transferred, the condition data coinciding with the printing condition set in the image forming apparatus so as to make the printing means give a priority to execute the printout of the external data associated with the condition data thus selected.

Furthermore, the invention is characterized in that the printing condition set in the image forming apparatus specifies a size of sheets which can be processed by the image forming apparatus.

According to the invention, the printing means can be switched to the printout of another data without interruption. If, for example, a size of sheets which can be processed by the image forming apparatus coincides with a size of sheets specified by external data, the printing means can be switched to the printout of such data on sheets having a size which coincides with the size designated by the external data. Hence, an operating efficiency of the printing means can be enhanced.

The invention is characterized in that the image forming apparatus further includes output means for outputting information directive of changing the printing condition set in the image forming apparatus when some of the condition data do not coincide with the printing condition set in the image forming apparatus.

According to the invention, an operator recognizes the necessity of changing the printing condition from the outputted information. Thus, the printing condition is changed so that the printing operation can be carried out with certitude.

Furthermore, the invention is characterized in that a plurality of types of sheets containing data to be recorded are provided, external data accompanied by the condition data indicating the printing condition of the external data is transferred from the external terminal, and when the external data and the condition data is transferred from the external terminal during a sequence of the printing operation, the control means detects the start time of a suspended period required for replenishing sheets to be printed which have run out, so as to make the printing means execute the printout of the transferred external data at the start time thus detected if a type of sheets specified by the transferred condition data differs from the type of sheets having run out.

According to the invention, the external data may be utilized for continuing the printing operation of the printing means in the similar manner as described above. Particularly, in this case, the suspended period is resulted when there is no sheet to be fed to the printing means so that the printout of the copy data cannot be carried out until the sheets are replenished. Accordingly, the invention provides a better advantage of improving the operating efficiency of the printing means.

Furthermore, the invention is characterized in that the control means detects the completion time of the suspended period to make the printing means execute again the operation of printing the copy data instead of the operation of printing the external data from the completion time thereof.

Furthermore, the invention is characterized in that the control means allows the printing means to restart the printout of the copy data upon the completion of the printout of the external data.

According to the invention, when a temporarily suspended printout of the copy data is carried out, the suspended period of the printing means can be shortened during which the printing means cannot execute the printing operation, thus providing a substantially successive printing operation of the printing means.

Furthermore, the invention provides an image forming apparatus which is used in connection with an external terminal for transferring external data to be printed and is provided with reading means for reading an image of a document at a predetermined reading position and printing means for printing the data read by the reading means as copy data on a sheet whereby the external data transferred from the external terminal can be printed on the sheet with the printing means as required, the apparatus comprising:

control means for setting a standby state for allowing the printing means to give a priority to the printout of the external data upon the completion of expanding the external data transferred from the external terminal into data which can be printed with the printing means and printing the copy data upon the completion of the printout of the external data.

According to the invention, the standby state is set such that when the external data transferred from the external terminal have been expanded into data which can be printed out by the printing means, a priority is given to the printout of the external data, and when the printout of the external data is completed, the printout of the copy data is carried out. Hence, a notable improvement of the operating efficiency of the printing means is achieved.

Furthermore, the invention is characterized in that the control means carries out concurrently an image reading processing for reading a document by means of the reading means and a processing for obtaining the copy data from read data with the printout of the external data by way of the printing means.

According to the invention, in the case where the printout of copy data coincides with the printout of external data from an external terminal, a priority is given to the printing of the external data from the external terminal so that the printing of the copy data immediately upon the completion of the printing of the external data by reading and processing the image of the copy data during the printout of the external data. This eliminates the suspended period of the printing means, thereby further improving the operating efficiency thereof. Insomuch as the external data from the external terminal does not require the image reading processing and the like, the processing time will be shortened.

Accordingly, the operating efficiency can be enhanced by giving a priority to the external data.

Furthermore, the invention provides an image forming apparatus which is used in connection with a plurality of external terminals for transferring external data to be printed and the condition data representative of the printing condition of the external data and is provided with reading means for reading an image of a document at a predetermined reading position and printing means for printing the data read by the reading means as copy data on a sheet whereby the external data transferred from the external terminal can be printed on the sheet with the printing means as required, the apparatus comprising:

memory means for sequentially storing the external data transferred from the plurality of external terminals;

selecting means for selecting the external data having condition data which coincides with the printing condition set in the image forming apparatus when the external data stored in the memory means is printed;

priority setting means for setting an order of printing the external data selected by the selecting means on the basis of a predetermined order of priority, and control means for allowing the printing means to carry out the printout of the external data stored in the memory means in accordance with the order of priority set by the priority setting means.

According to the invention, since the order of priority is determined in the state in which it is confirmed that the printing condition of the external data which will be transferred coincides with the condition which can be processed in the image forming apparatus, the recording means will never fall into a malfunction and can carry out the printing operation successively. This provides an improved operating efficiency of the printing means while reducing time required for the printout of the external data without depending on a high-speed printing.

Furthermore, the invention is characterized in the priority setting means gives a higher priority to the external data requiring a longer processing time.

According to the invention, in a period during which the external data of the top priority is printed, the residual external data can be expanded into bit data which can be printed with the printing means so that the suspended period of the printing means can be shortened. The external data requiring a longer processing time include, for example, the external data of a large quantity of data, or the external data which requires much time for producing printouts such as two-sided prints or printouts requiring post-processing such as stapling.

Furthermore, the invention is characterized in that when new external data is transferred from another external terminal during the printing operation on the basis of the order of priority, the priority setting means reassigns the order of priority to the new external data and the other external data yet to be printed to reset the order of priority.

According to the invention, an effect of successive printing operations of the printing means is enhanced and the operating efficiency thereof can be improved.

Furthermore, the invention is characterized in that when the printing operation of the printing means is interrupted owing to the occurrence of trouble such as involving the printing means running out of sheets during the printout of certain external data, the control means allows the printing means to carry out in succession the printing of external data having a printing condition different from and the priority lower than the external data the printing of which is interrupted.

According to the invention, a period can be shortened during which the printing operation of the printing means is temporarily suspended.

Furthermore, the invention is characterized in that the control means allows the printing means to carry out the printout of external data stored in the memory means according to the order of priority set by the priority setting means and to carry out the printing operation under a condition most close to the printing condition of the condition data.

According to the invention, a failure in the printout of external data can be avoided which is excluded by the selecting means. In other words, unless the printing condition of the external data complies with the condition which can be processed by the image forming apparatus, the printing means remains unable to start the printout of the external data, and is suspended in that state. To avoid this, the external data is subject to the printing operation under a condition most close to the printing condition thereof and hence, the suspended time of the printing means is eliminated for an improved operating efficiency thereof.

Furthermore, the invention provides an image forming apparatus which is used in connection with an plurality of external terminals and is provided with reading means for reading an image of a document at a predetermined reading position and printing means for printing the data read by the reading means as copy data on a sheet whereby the external data transferred from the external terminal can be printed on the sheet with the printing means as required, the apparatus comprising:

memory means for sequentially storing the external data transferred from the plurality of external terminals;

dividing means for dividing the external data from the plurality of external terminals into groups of a predetermined number in the order of the receipt thereof;

selecting means for selecting the external data having the condition data which coincides with the printing condition set in the image forming apparatus when the external data stored in the memory means is printed;

priority setting means for setting a printing order of the external data grouped by the dividing means based on a predetermined order of priority; and control means for allowing the printing means to execute the printing operation for each group of the external data stored in the memory means in accordance with the order of priority.

According to the invention, a situation can be avoided where if an order of priority is reassigned to a plurality of external data items at each transfer of new external data, some external data items previously transferred may continue to be left off. That is, external data received earlier is prevented from being left off by grouping the external data in the order of receipt thereof and setting an order of priority within the group because the succeeding group is not subject to the printing operation until all the external data of the group is printed out.

Furthermore, the invention is characterized in that the image forming apparatus further comprises priority order changing means for providing an arbitrary change of the order of priority as required.

According to the invention, a priority can be given to the printout of the external data having a lower priority to be left off if it is required.

BRIEF DESCRIPTION OF THE DRAWINGS

Other and further objects, features, and advantages of the invention will be more explicit from the following detailed description taken with reference to the drawings wherein:

FIG. 14 is a timing chart illustrating the setting of the order of priority in a seventh mode of the invention;

FIG. 15 shows an example of a display illustrating an eighth mode of the invention for instructing a change after the setting of the order of priority.

DETAILED DESCRIPTION OF THE PREFERRED EMBODIMENTS

Figure 1:
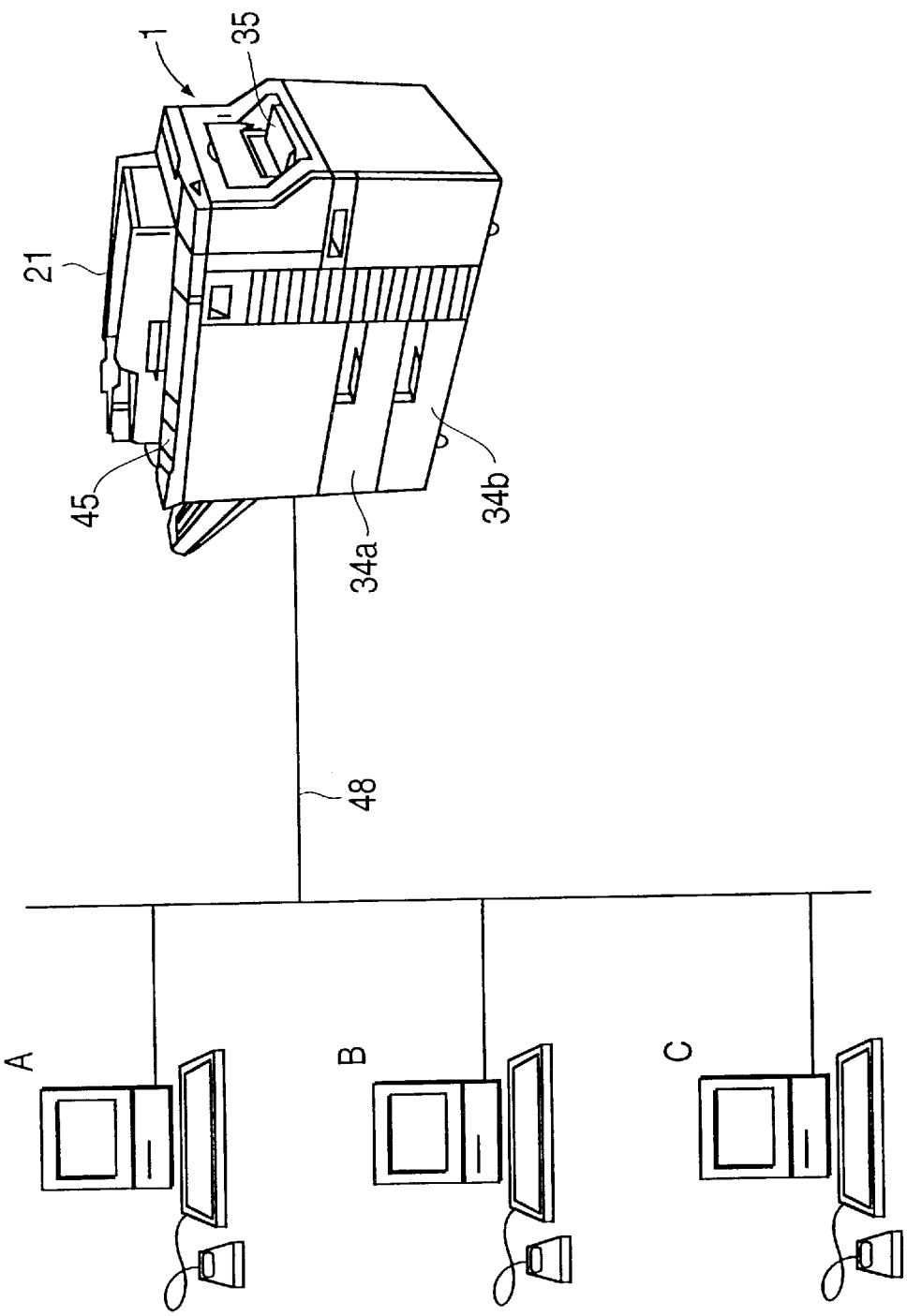
FIG. 1 is an overall system view showing a state in which an image forming apparatus of the invention is connected to an external terminal via an communication line.

Now referring to figures, preferred embodiments of the invention are described below.

Referring to the drawings, an explanation will be given below with respect to an image forming apparatus wherein an image of a document is read, copy data which can be printed with the printing means is subjected to an image processing and the copy data is printed on the sheet, and external data from an external terminal is printed, as required.

Figure 2:
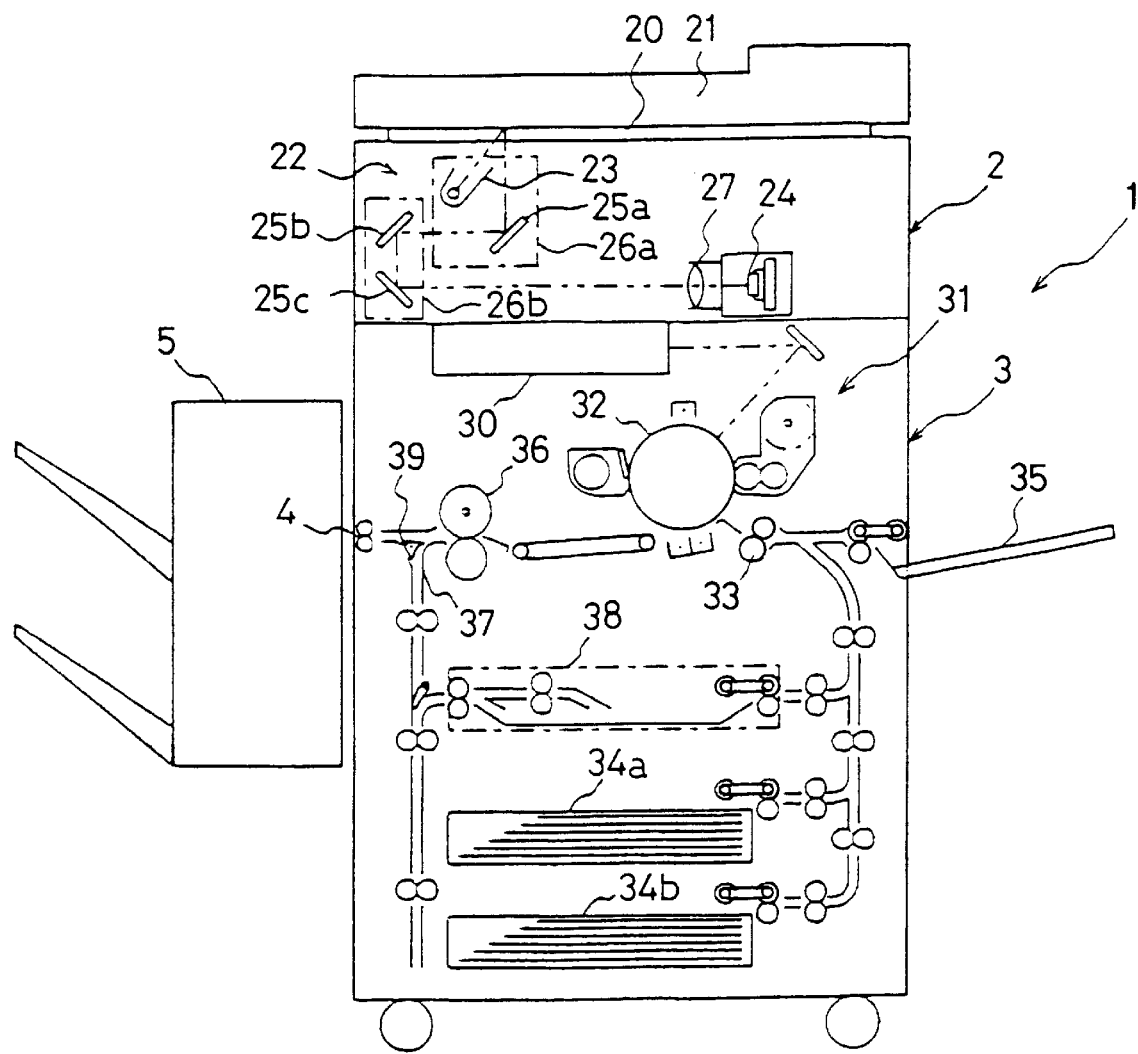
FIG. 2 is a side elevation showing an interior construction of the image forming apparatus of the invention.

The invention will be described by way of an example of a digital copying machine having a copy mode, and a print mode, a fax mode. FIG. 1 is an illustration of the whole system of the digital copying machine of the invention and external terminals interconnected via a communication line. FIG. 2 is a side elevation showing an interior construction of the digital copying machine of FIG. 1.

In the beginning, with respect to FIG. 2, the digital copying machine which is a digital image forming apparatus will be described. The digital copying machine generally comprises a scanner section 2 and a laser printing section 3, namely a printer section as a main body 1 thereof.

The scanner section 2 comprises a document placement base 20 formed of transparent glass, a two-sided automatic document feeder (ADF) 21 for automatically feeding and transporting a document to the document placement base 20, and a scanner unit 22 or a document image reading unit for reading the document image by scanning an image of a document placed on the document placement base 20.

Document image data (read data) obtained by the scanner section 2 is processed into copy data which can be printed by a printer section 3 and transferred to an image data input section described later where the copy data is subject to a predetermined image processing.

The ADF 21 is adapted to automatically feed the document one by one from an unillustrated document tray provided thereat onto the document placement base 20 of the scanner unit 22, the document tray receiving a plurality of documents set thereon at a time. The ADF 21 comprises a transport path for a one-sided document, a transport path for a two-sided document and transport path switching means such that the scanner unit 22 may read either one side or two sides of a document depending upon the selection of an operator. Further description thereof is omitted because a number of applications have been filed on the ADF and a number of products have been marketed. The ADF 21 can be embodied with the known art.

The scanner unit 22 constituting the scanner section 2 for reading the document image on the document placement base 20 comprises a lamp reflector assembly 23 for exposing the surface of the document to light, a first scanning unit 26a equipped with a first reflection mirror 25a for guiding by reflection reflected light from the document to a photoelectric transducing device (CCD) 24, a second scanning unit 26b equipped with a second and a third reflection mirrors 25b–25c for guiding the light image reflected by the first reflection mirror 25a to the photoelectric transducing device (CCD) 24, a lens 27 for focusing the light image reflected from the document onto the photoelectric transducing device (CCD) 24 by means of reflection mirrors 25a through 25c, and the CCD 24 for converting the light image reflected by the document into an electric image signal.

The scanner section 2 is adapted to cause the scanner unit 22 to move along the lower surface of the document placement base 20 for reading an image of a document while sequentially placing the document to be read on the document placement base 20 by way of the associated operation of the ADF 21 and scanner unit 22. In particular, the first scanning unit 26a is adapted to travel along the lower surface of the document placement base 20 from the left side toward the right side thereof, as seen in the figure, at a constant speed of V while the second scanning unit 26b is so controlled as to travel parallel in the same direction at a speed of V/2 relative to the first scanning unit. This allows the document thus placed to be read line by line for sequentially focusing the image thus obtained on the CCD 24.

Image data obtained by the scanner unit 22 reading the image of the document is supplied to an image processing section described later where the image data is subject to different processes to be rendered into copy data which can be printed by the printer section 3. The resultant copy data is committed to a temporary storage in a memory of the image processing section. Responding to an output request, the memory applies the copy data to the laser printer section 3 for printing the image on the sheet.

This (laser) printer section 3 comprises a transport system for transporting a sheet to receive an image thereon, a laser writing unit 30 and an electrophotographic process section 31 for forming an image.

The laser writing unit 30 comprises a semiconductor laser for emitting laser beams correspondingly to the copy data read out from the memory which have been read by the scanner unit 22 or to the external data transferred from the external terminal, a polygon mirror for deflecting the laser beams at an equiangular speed, an f-θ h lens for making a correction such that the laser beams deflected at the equiangular speed may be deflected on a photoconductive drum 32 at the equiangular speed, the photoconductive drum constituting the electrophotographic process section 31.

The electrophotographic process section 31 comprises a known photoconductive drum 32 with a corona charger, a developing unit, a transfer corona, a sheet separator, a cleaner, a discharger and the like disposed in the periphery thereof.

On the other hand, the sheet transport system comprises a sheet transport section 33 for transporting a sheet P to the electrophotographic process section 31 for forming an image, particularly to a transferring position provided with the transfer corona, sheet feeding cassettes 34a, 34b for feeding the sheet P to the sheet transport section 33, a manual feed device 35 for feeding a sheet having a required size when it is necessary, a fixing unit 36 for fixing an image, particularly a toner image, transferred onto the sheet P, a switch back transport passage 37 for reversing the sheet P with the image fixed thereon, thereby allowing the sheet P to receive another image on the back surface thereof or to receive images on the both sides of the sheet P, and an intermediate tray 38 for receiving the sheet P which passes through the transport passage 37.

In addition, disposed downstream side of the fixing unit 36 is a switch claw 39 for switching the sheet P between the switch back transport passage 37 and a discharge section 4 through which the sheet P completing the image forming process is transported to a post-processor 5.

In particular, the sheet feeding cassettes 34a and 34b of the sheet transport system contains therein sheets of sizes desired by the operator, respectively. The manual feed device 35 is used for feeding a small number of sheets having a size desired by the operator. By selecting a sheet size of the sheet feeding cassette or the manual feed device, the operator can feed sheets having a desired size.

In the laser writing unit 30 and the electrophotographic process section 31, copy data read out from the image memory or bit data which is stored in a state that is expanded into data which can be printed by the printer section 3 is formed into an electrostatic latent image on the surface of the photoconductive drum 32 by allowing the laser writing unit 30 to scan the data with the laser beams. The electrostatic latent image thus formed is visualized with a toner material. To receive the resultant toner image on the surface of the photoconductive drum 32, a sheet P having a selected size is transported from the sheet feeding cassette 34 or a manual feed device 35 to the transfer corona via the transport section 33. As a result, the toner image on the surface of the photoconductive drum 32 is transferred onto the surface of the sheet P, which sheet P is fed to the fixing unit 36. The image forming process is completed when the image is fixed so that the sheet P is transported to a sheet discharge processor 5 via the discharge section 4.

Description of Circuit in Image Processing Section

Next, with respect to the digital copying machine 1, description will be made on the arrangement and functions of the image processing section for image processing document image information obtained by reading the document.

Figure 3:
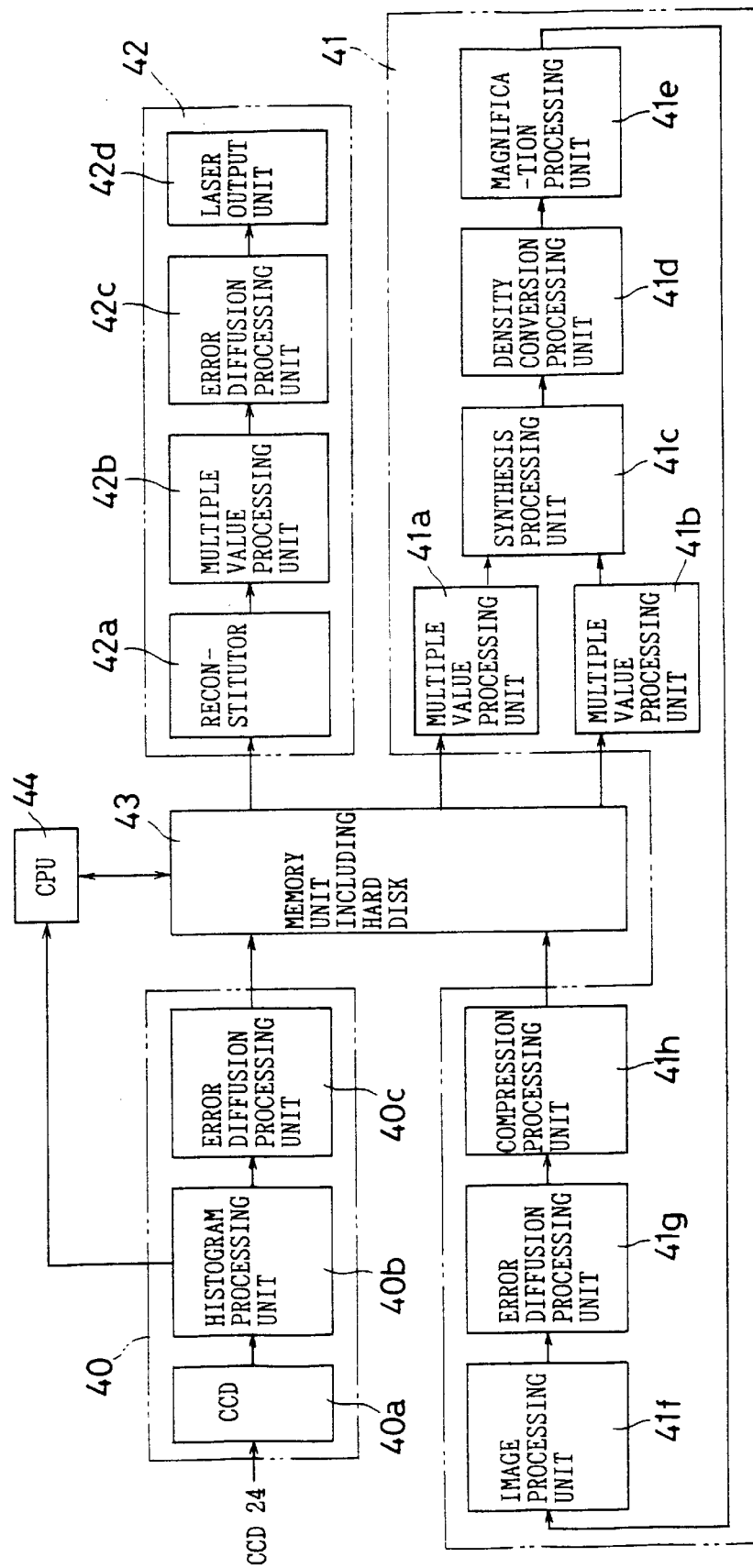
FIG. 3 is a block diagram showing a circuit arrangement of an image processing section of the image forming apparatus of the invention, particularly a digital copying machine.

FIG. 3 is a block diagram for illustrating the image processing section in the digital copying machine 1 of FIG. 2. The image processing section of the digital copying machine 1 comprises an image data input unit 40, an image processing unit 41, an image data output unit 42, a RAM (Random Access Memory), a memory unit 43 comprising a hard disk and the like, and a Central Processing Unit (CPU) 44.

The image data input unit 40 includes a CCD 40a, a histogram processing unit 40b and an error diffusion processing unit 40c. The image data input unit 40 is adapted to convert the image data of a document read from the CCD 24 into binary data for plotting digital values of the binary data thus converted in the form of the histogram and to process the image data by means of the error diffusion method which image data is committed to a temporary storage in the memory unit 43.

In other words, after converting an analog signal corresponding to a density of each pixel of the image data into a digital signal, the CCD 40a effects an MTF correction, a black-and-white correction or a gamma correction to output the digital signal (8 bits) of, for example, 256 levels of gray to the histogram processing unit 40b.

The histogram processing unit 40b obtains density information (histogram data) indicative of the total number of pixels of each density of 256 levels of gray from the digital signal applied by the CCD 40a. The resultant histogram data is supplied to the CPU 44 or to the error diffusion processing unit 40c, as pixel data when needed.

By means of the error diffusion method, a kind of pseudo-intermediate processing by which an error of binary conversion is reflected upon a judgment made on the binary value of an adjacent pixel, the error diffusion processing unit 40c converts an 8 bit-long digital signal of a pixel applied by the CCD 40a into 1 bit-long signal (binary), thereby carrying out a redistribution operation for faithfully reproducing the density of a local area of a document.

The image processing unit 41 includes a multiple value processing units 41a and 41b, a synthesis processing unit 41c, a density conversion processing unit 41d, a magnification processing unit 41e, an image processing unit 41f, an error diffusion processing unit 41g and a compression processing unit 41h.

The image processing unit 41 is adapted to effect a final conversion of inputted image data into such image data as desired by the operator and perform the processing until the image data finally converted into the copy data is stored in the memory unit 43. It should be noted, however, that each of the processing units of the image processing unit 41 is actuated when needed but is not always actuated. More specifically, the multiple value processing units 41a and 41b operate to reconvert binary data obtained by the error diffusion processing unit 40c into data having 256 levels of gray.

The synthesis processing unit 41c selectively performs a logical operation for each pixel, such as a logical OR, a logical AND or an exclusive OR. The target data of such operation includes image data stored in the memory unit 43 and bit data from a pattern generator (PG).

The density conversion processing unit 41d processes a data signal having 256 levels of gray for arbitrarily setting a relation of the output density to the input density on the basis of a predetermined gray level conversion table. The magnification processing unit 41e obtains pixel data (density value) on a target pixel changed in the magnification by interpolating an instructed magnification into inputted known data whereby the magnification of auxiliary scanning is changed, followed by change in the magnification of primary scanning. The pixel processing unit 41f performs various image processings with respect to inputted pixel data and collects information on data sequence such as character extraction and the like. The error diffusion processing unit 41g performs a similar processing to the error diffusion processing unit 40c of the image data input unit 40. The compression processing unit 41h compresses binary data by means of a run-length coding. The compression of image data is effected in the final processing loop upon the completion of the final output of the image data.

In addition, the image data output unit 42 comprises a reconstitutor 42a, a multiple value processing unit 42b, an error diffusion processing unit 42c, and a laser output unit 42d. The image data output unit 42 is adapted to reconstitute compressed image data stored in the memory unit 43 into the original data having 256 levels of gray, diffuse errors in 4 bit data for a smoother halftone rendition than 2 bit-long data, and transfer the resultant data to the laser output unit 42d.

In other words, the reconstitutor 42a reconstitutes the image data compressed by the compression processing unit 41h. The multiple value processing unit 42b carries out a processing similar to the processing performed by the multiple value processing units 41a and 41b of the image processing unit 41. The error diffusion processing unit 42c carries out a processing similar to the processing performed by the error diffusion processing unit 40c of the image data input unit 40. The laser output unit 42d is responsive to a control signal from an unillustrated sequence control to convert digital pixel data into an ON/OFF signal for turning on or off the semiconductor laser of the laser writing unit 30 to write an electrostatic latent image on the surface of the photoconductive drum 32.

Incidentally, data processed by the image data input unit 40 and image data output unit 42 is essentially stored in the memory unit 43 in the form of binary data for occupying less memory area, but it is also possible to process such data in the form of quarternary data in consideration of the deterioration thereof.

Description of Control Configuration of the Whole Digital Copying Machine

Figure 4:
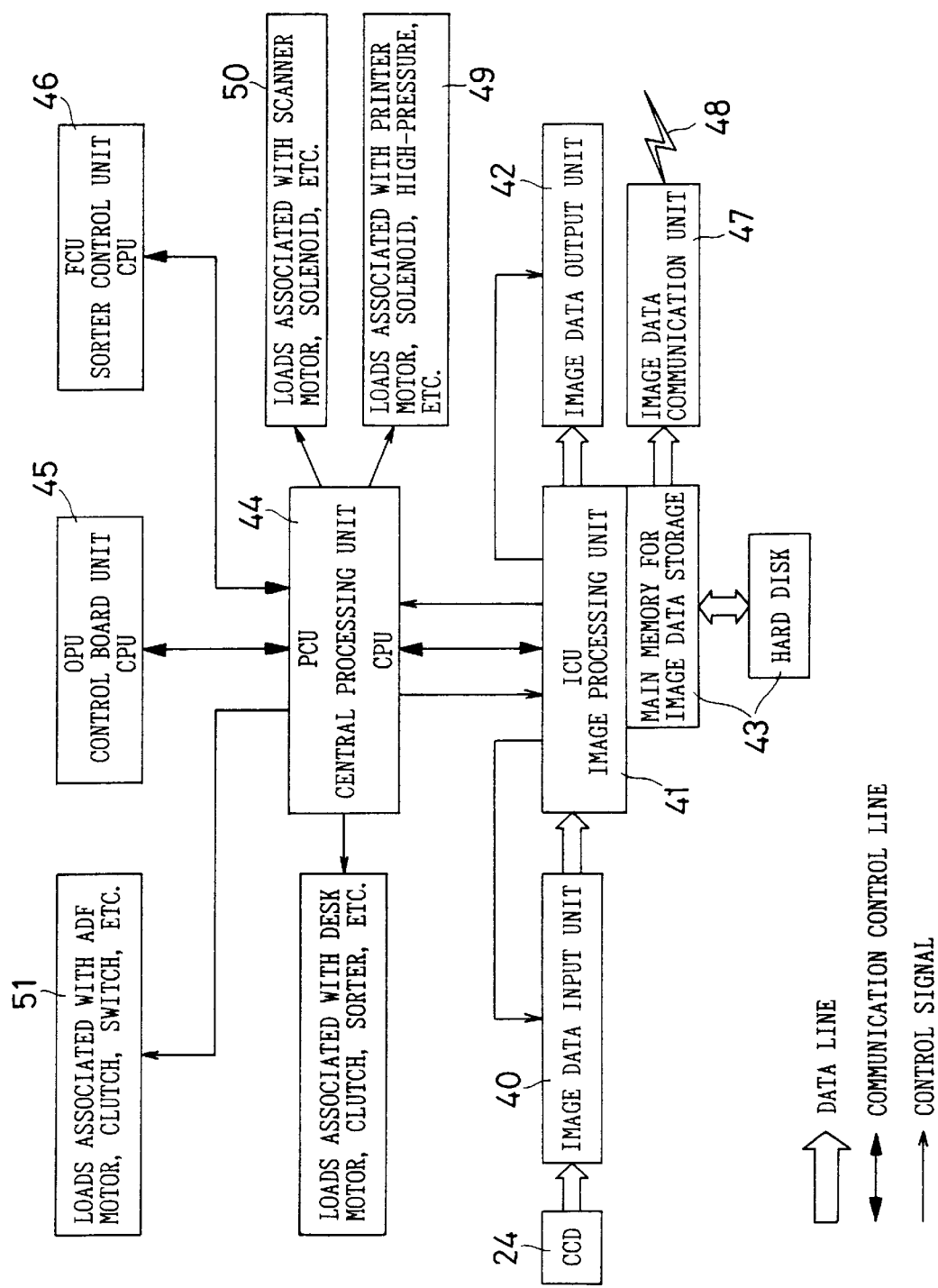
FIG. 4 is a block diagram of a whole control section associated with an image processing and a sheet discharging process of the digital copying machine including the image processing section.

FIG. 4 is a view illustrating a state in which the Central Processing Unit (CPU) 44 controls each section of the whole body of the digital copying machine 1. Description of the CCD 24, the image data input unit 40, the image processing unit 41, the image data output unit 42, the memory unit 43 and the Central Processing Unit (CPU) 44 is the same with that of FIG. 3 and therefore, the description thereof is omitted.

The Central Processing Unit (CPU) 44 manages respective drive mechanisms constituting the digital copying machine 1 by means of a sequence control, applying control signals to the respective drive mechanisms such as the ADF 21, the scanner section 2 and the laser printer section 3 which were described with reference to FIG. 1.

Furthermore, the Central Processing Unit (CPU) 44 is connected to a control board unit 45 comprising a control panel for intercommunication therebetween such that a control signal corresponding to a copy mode set and input by the operator is transmitted to the Central Processing Unit 44 which, in turn, controls the digital copying machine 1 on the basis of the set mode.

In addition, the Central Processing Unit 44 is adapted to transmit a control signal indicative of an operation state of the digital copying machine 1 to the control board unit 45 which, in turn, indicates to the operator the present operation state of the copying machine 1 by means of a display and the like.

Reference numeral 46 designates a sorter control unit which is a control unit for controlling an operation of the post-processor for sorting produced copies discharged from the digital copying machine 1.

Reference numeral 47 designates an image data communicating unit which is provided for communicating information such as image information, an image control signal and the like with other digital image equipment. More specifically, the image forming apparatus of the invention is communicated with external terminals A through C of FIG. 1 such as the personal computer, the word processor and the like, via a communication line 48, for downloading data by means of the communicating unit 47. In the case where the communicating unit 47 is connected to a facsimile machine, the communicating unit 47 is equipped with a modem to be connected to a counterpart via a telephone line.

The CPU 44 downloads external data supplied from the external terminals A through C via the communicating unit 47 to store the data in the memory unit 43 or the hard disk. Then, the CPU causes the image processing unit 41 to expand the data into data which is subjected to the image forming process at the printer section 3 and then store the data which can be printed by the printer section 3 in the memory unit 43. According to the invention, the printout of the stored external data is carried out during a period in which the printing operation of the printer section 3 is temporarily suspended which will be described later in detail.

In addition, the CPU 44 outputs a control signal for driving various loads 49 of the printer section 3, thereby starting the printing operation, a control signal for driving various loads 50 of the scanner section 2, thereby reading the document image, and a control signal for driving various loads 51 of the ADF 21. When the printer section 3 is driven, the CPU 44 is supplied with a signal indicative of a rotary position of the unillustrated photoconductive drum and a detection signal for detecting a condition in which a sheet is transported, thereby keeping track of an operating condition of the printer section. Thus, an occurrence of trouble in the printer is detected, such as paper jamming in the transport passage, a rotation failure of the photoconductive drum and the like.

Besides, in the scanner section 2, the scanning is started depending on the detection state of a home position sensor of the first scanning unit 26a. Supplied with a signal from the home position sensor and a signal from a sensor for detecting the completion of scanning, the CPU 44 keeps track of the operation state of the scanner section to judge whether the operation is normal or not. In particular, the time between the start and the end of scanning is constant and therefore, an occurrence of the trouble in the scanner section may be readily detected when the scanning is not completed within the constant time period.

Besides, the ADF 21 also inputs to the CPU 44 signals from various sensors for detecting a jammed document in the transport system for transporting the document to a reading position and for discharging the read document such that an occurrence of trouble in the ADF 21, such as a jammed document during the transport, is readily detected. In particular, the CPU 44 makes a self-diagnosis in advance to determine whether the ADF 21, the printer section and the scanner section will operate normally or not before starting the printout of the image, particularly at a start up of the power source of the machine. It is conventionally known to those skilled in the art that the self-diagnosis is readily made by inputting signals from various sensors to the CPU. Thus, a detailed description thereof is omitted.

As described above, the CPU 44 is capable of grasping an operation state of the printer section each time it is operated as well as reliably grasping the operation state of the ADF 21 and the scanner section 2 and an occurrence of trouble therein. It is conventionally known to those skilled in the art that particularly the CPU 44 is adapted to control the image printing operation of the digital copying machine 1, as described above, and to continuously detect the respective controls and an occurrence of trouble. Hence, a detailed description thereof is omitted.

Figure 5:
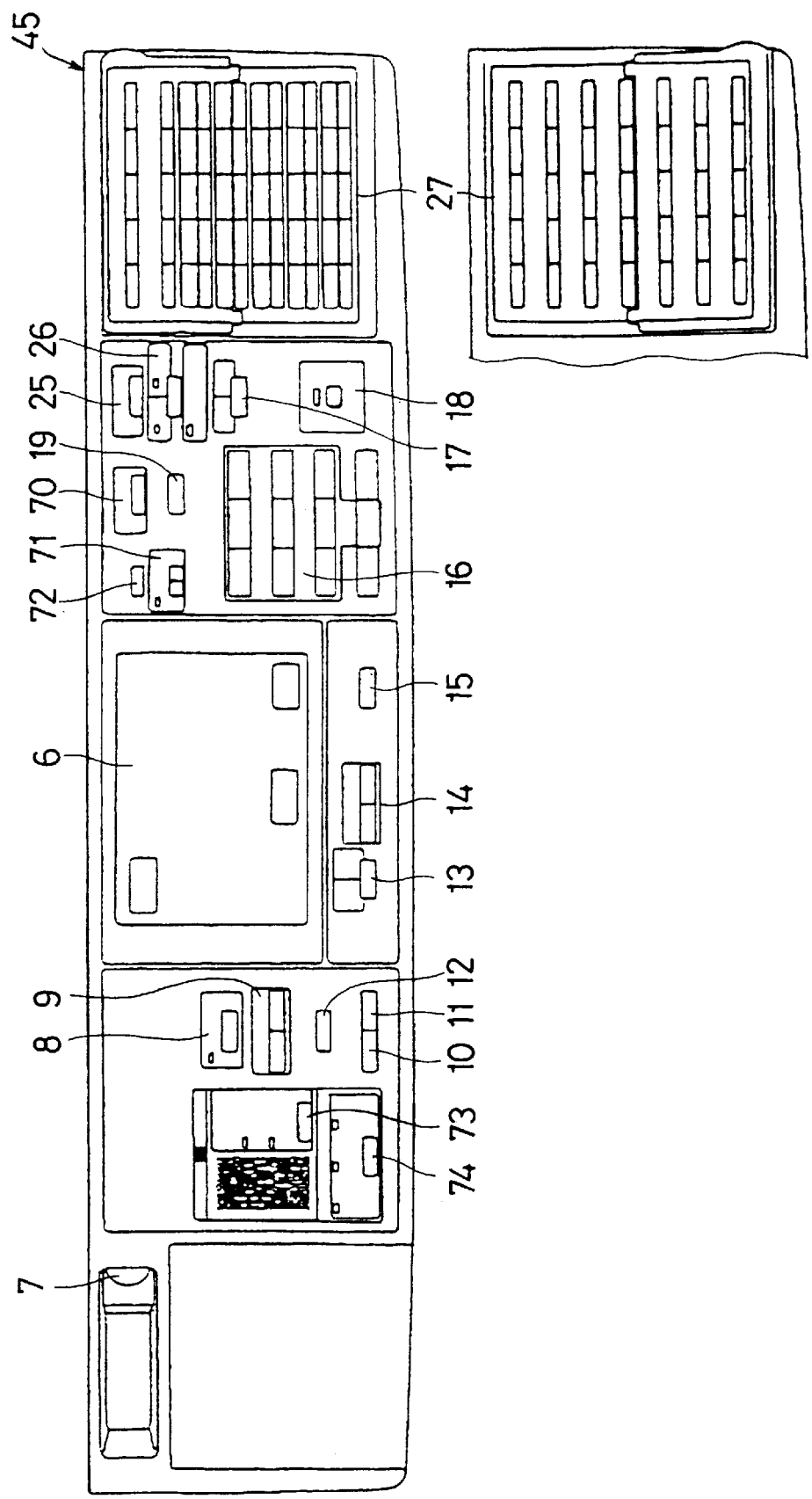
FIG. 5 is a top plane view showing an example of a control panel of a digital copying machine.

FIG. 5 is a plane view showing an example of the control panel at the control board unit 45 of the digital copying machine 1. Disposed at the center of the control panel is a touch-panel liquid crystal display unit 6 around which a group of mode setting keys of each kind are arranged.

Disposed on a screen of the touch-panel liquid crystal display unit 6 is a request area for switching displays for selecting image editing functions at constant times. Upon depressing the area directly with a finger, a list of various editing functions is displayed on the screen for selecting any of the functions. The operator may touch with the finger an area representing a desired editing function out of the displayed editing functions to select and set the desired editing function on the list.

A brief description is made on the group of mode setting keys of each kind disposed on the control panel on the basis of reference numerals attached thereto. Reference numeral 7 designates a dial for adjusting the brightness of the screen of the liquid crystal display unit 6.

In addition, reference numeral 8 designates an automatic magnification setting key for setting a mode of automatic selection of magnification, 9 a zoom key for setting the copy magnification by a rate of 1%, 10 and 11 fixed magnification keys for reading and setting the fixed magnification, and 12 a standard magnification key operated to return the copy magnification to the standard magnification (onefold).

Reference numeral 13 designates a density switching key for switching the adjustment of a copy density between an automatic mode and a manual mode or a photograph mode, 14 a density adjusting key for providing a fine adjustment of density level in the manual or photograph mode, and 15 a tray selecting key for selecting a desired sheet size from sizes of sheets set in the sheet feeding section of the copying machine.

Reference numeral 16 designates a sheet number setting key for setting the number of sheets of copy, 17 a clear key for clearing the set number of sheets of copy or interrupting a continuous copy production, 18 a start key operative to direct the start of the copy production, and 19 all clear key operative to clear all the modes set at present for returning the machine to its normal state, 70 an interruption key used when a copy of another document is to be made during a continuous copy production, 71 a control guide key used to present a message indicating how to operate the machine when the operator needs such guidance, and 72 a message stepping-around key used for presenting a sequel to a message displayed by the operation of the control guide key 71.

Reference numeral 73 designates a two-side copy mode key for setting a two-side copy mode, and 74 a discharge process mode setting key used for setting an operation mode of a sheet discharge processor 5 for sorting copies discharged from the copying machine.

Reference numerals 25 through 27 designate setting keys associated with a printer mode and a facsimile mode, 25 a memory transmission mode key used for transmitting the content of a document to be transmitted after a temporary storage thereof, 26 a copy-fax-printer mode switching key operative to switch the digital copying machine 1 between a copy/fax mode and a printer mode, and 27 a one-touch dial key for dialing with a one-touch operation any one of the phone numbers to be contacted by storing the numbers in advance.

FIG. 1 is a system view showing a state wherein the image forming apparatus of the invention, in particular, the digital copying machine 1, is connected to external terminals A through C via the communication line 48. First, a description will be made on a system configuration of various information equipments including the digital copying machine 1 which are installed at an office.

Here, as the information equipments existing at the office, the external terminals A through C include a personal computer, a word processor and the like, which are connected to the digital copying machine 1 via the communication line 48. When, as required, any of the external terminals A through C transfers image (external) data to be printed which is accompanied by a printout request, the digital copying machine 1 starts a printing operation after confirming that the printer section 3 is not in operation. The respective external terminals are connected to the digital copying machine 1 by means of a generally used interface (I/F) such as a SCSI for exchanging the data with each other. The content of the data includes image (external) data for carrying out the printing operation, such as a command for control, a density data regarding the image to be printed, a size of the sheet and the like.

In FIG. 1, personal computers are connected to one digital copying machine 1 as external terminals A through C which are a plurality of information equipments. In response to a printout request issued by any of the personal computers A through C, the digital copying machine 1 prints out on a sheet external data transferred from the external terminals.

Furthermore, the digital copying machine 1 also reads an image of a document fed by the ADF 21 and processes the read data into copy data, thereby normally giving a priority to the data to be printed. When the printer section of the digital copying machine 1 is unable to continue the operation and is temporarily suspended, the printer section starts printing the external data transferred from one of the external terminals in response to a printout request from the external terminal.

Printing Mode and Copy Mode

The digital copying machine 1 is normally set to a copy mode. Responding to an operation of the start key, the digital copying machine 1 causes a document, if it is set at the ADF 21, to be transported to the reading position for reading the document. The data thus read is image processed by the image processing unit so as to be printed by the printer section 3, as described with reference to FIG. 3. The image data thus image processed is stored as copy data in the memory unit 43. When the preparation for the printing operation of the printer section 3 is completed, the copy data is sequentially read out from the memory unit 43 while the laser of the laser writing unit 30 is controlled on the basis of the processing of the image data output unit 96 to apply beams corresponding to the data onto the photoconductive drum 32.

If any of the external terminals A through C transfers external data during the printing operation in the normal copy mode, the digital copying machine 1 stores the external data thus transferred upon a request made for the printout of the external data, thereby setting the printout of the external data in a standby condition. As described above, the digital copying machine 1 gives a priority to the ongoing printing operation in the copy mode for producing copies of the read document. When the printing operation in the printer section 3 is not continued to be temporarily suspended, the printout of the external data from the external terminal is carried out on the basis of the printing request thereof. Accordingly, even though operating in the copy mode, the printer section 3 is caused to print the external data when it is suspended with the operation thereof in the copy mode being disabled because the CPU 44 grasps or detects the suspension of the printer section 3.

In this case, the external data transferred from the external terminals is expanded into such data to be printed by the printer section 3 of the digital copying machine 1. The preparation for the printing operation is completed when the expanded data is committed to storage in the memory unit 43. Upon the completion of the printing preparation, the CPU 44 applies the external data stored in the memory unit 43 to the laser writing unit 30 via the image data output unit 42 on condition that the suspension of the printer section 3 is detected, while controlling the respective loads of the printer section 3 to start the printing operation. Thus, the printout of the external data is initiated from any of the external terminals A through C.

When the copying machine 1 is started up for printing the copy data prepared by processing the data obtained by reading an image of a document, the CPU 44 detects such a condition of the copying machine 1, thereby temporarily suspending the printout of the external data from the external terminal and starting the printout of the copy data. Otherwise, the CPU 44 waits for the completion of the printout of the external data from any of the external terminals A through C to restart the printout of the copy data.

Now, the temporary suspension of the printer section 3 of the invention will be described in detail. The suspension (suspended period) refers to, for example, an image processing period during which the ADF 21 transports a document to a position for the scanner section 2 to read an image of the document, and data thus obtained is image processed into copy data to be committed to storage in the memory unit 43. In this period, the printer section 3 is not carrying out the printing operation, or in suspension. That is, the suspended period is defined as a period between the completion of the printout of the copy data of the document and the completion of processing of the data obtained by reading the succeeding document into the copy data.

In other words, the printer section 3 temporarily suspends the printing operation in a suspended period from the start of the transport of the document to the reading position upon the completion of copying the preceding document until the completion of image processing of the data thus read.

The CPU 44 can readily detect this period. In other words, upon the completion of the printout of the copy data of a document, the CPU 44 applies a request signal to the loads 51 of the ADF 21 for transporting the succeeding document to be read. Then, after the read data is image processed into copy data, the CPU 44 applies a request signal to the printer section 3 for starting the printing operation. Accordingly, the time between the application of the request signal to the ADF 21 to the application of the request signal to the printer section 3 can be detected as the suspended period of the printer section 3.

Therefore, the CPU 44 detects the suspended period, particularly the beginning of the period. At this point, if the external data has been transferred from any of the external terminals A through C and has been stored, the CPU 44 causes the printer section to start the printout of the external data. If all the external data has been printed in the suspended period of the printer section 3, the printer section 3 restarts printing the copy data in the copy mode at the end of the suspended period. However, very short is the suspended period during which the succeeding document is transported, read and image processed. In the case where the external data covers a plurality of pages, it is impossible to print all the external data in such a period. In this case, it is desirable to print the remaining external data in the succeeding suspended period. Alternatively, the printout of the external data may be continued with the printout of the copy data kept interrupted, which may be restarted when all the external data has been printed.

On the other hand, the suspended period of the printer section 3 is not limited to the paper feeding period described above. For example, a processing for reading an image cannot be carried out because of the occurrence of trouble involving the ADF 21, such as jamming or the like which disables the transport of a document. Accordingly, the user must eliminate the trouble in the ADF 21 or remove the jammed document. If the reading of the jammed document is completed in this case, the printer section 3 can continue the printing operation on the basis of the copy data of the document. However, the printer section 3 can not continue the operation because of the absence of the copy data of the succeeding document. If, on the other hand, data to be printed exists, the printer section 3 can carry on the printing operation independently. Thus, in the case of the detection of a trouble in the ADF 21, as described above, the CPU 44 may detect the suspended period of the printer section 3 the time when the printer section 3 completes the ongoing printing operation.

Similarly, the occurrence of trouble in the scanner section 2 also results in the suspended period of the printer section 3. An example of trouble in the scanner section 2 includes a case where the scanner section 2 fails to effect a normal reading of an image due to an insufficient amount of light. In this case, troubles in the scanner section 2 such as resulted from the end of life of an illumination lamp, a lower voltage of the power and the like, can be detected by detecting an amount of reflected light from the document for checking the shortage of the light amount.

Furthermore, in the scanner section 2, the first scanning unit 26 starts a scanning operation from the home position. When, for some unknown reason, the scanning operation is effected without detecting the home position, a simulation for detecting the home position is effected as troubleshooting. In this situation, the printer section 3 is not involved in this trouble and therefore, the printer section 3 is capable of effecting the printing operation. Thus, the suspension in the copy mode is detected. If, in this case, the home position is detected to stop the operation of the scanner section so that the CPU 44 is informed of the solution of the trouble while the copy data has been prepared, the printout of the transferred external data is temporarily stopped at a proper time so as to enable starting the printout of the copy data.

Incidentally, there is a case in which the document is not automatically transported, but the document is manually fed to the reading position. This also leads to a temporary suspension of the printing operation of the printer section 3. In this case, the ADF 21 can be opened. When the document is changed on the document placement base 20 by hand, the time when the ADF 21 is opened can be detected as the beginning of the suspended period of the printer section 3, which is readily detected by the CPU 44. Furthermore, the suspended period starts at the detection of the start time and ends at the completion of the image processing, during which time period the document is placed at position, an image of the document is read by the scanner unit 22 and the read data is processed into copy data.

In addition, the suspended period of the printing section exists as well. This means that there is a case in which the printer section 3 has to temporarily suspends the ongoing printing operation. For example, when sheets of a size subject to the printing process run out, the printer section 3 cannot continue the operation and is temporarily suspended. However, the printer section 3 is only unable to continue the printout of the copy data but is capable of printing on sheets of another size. If, in this case, the CPU 44 detects the start of the suspended period and determines that the external data from any of the external terminal equipments A through C is to be printed on sheets of another size than the sheets having run out, printout of the external data from the external terminal can be executed.

As described above, when the CPU 44 detects the start of the suspended period of the printer section 3 while the copying machine 1 is printing the copy data of the document in the copy mode, the CPU 44 causes the printer section 3 to start the printout of the external data transferred from the external terminal. This increases a utilization or an operating efficiency of the printer section 3 and allows a combined use of the copying machine for printing image data from other external terminals and printing the copy data in the copy mode.

Figure 6:
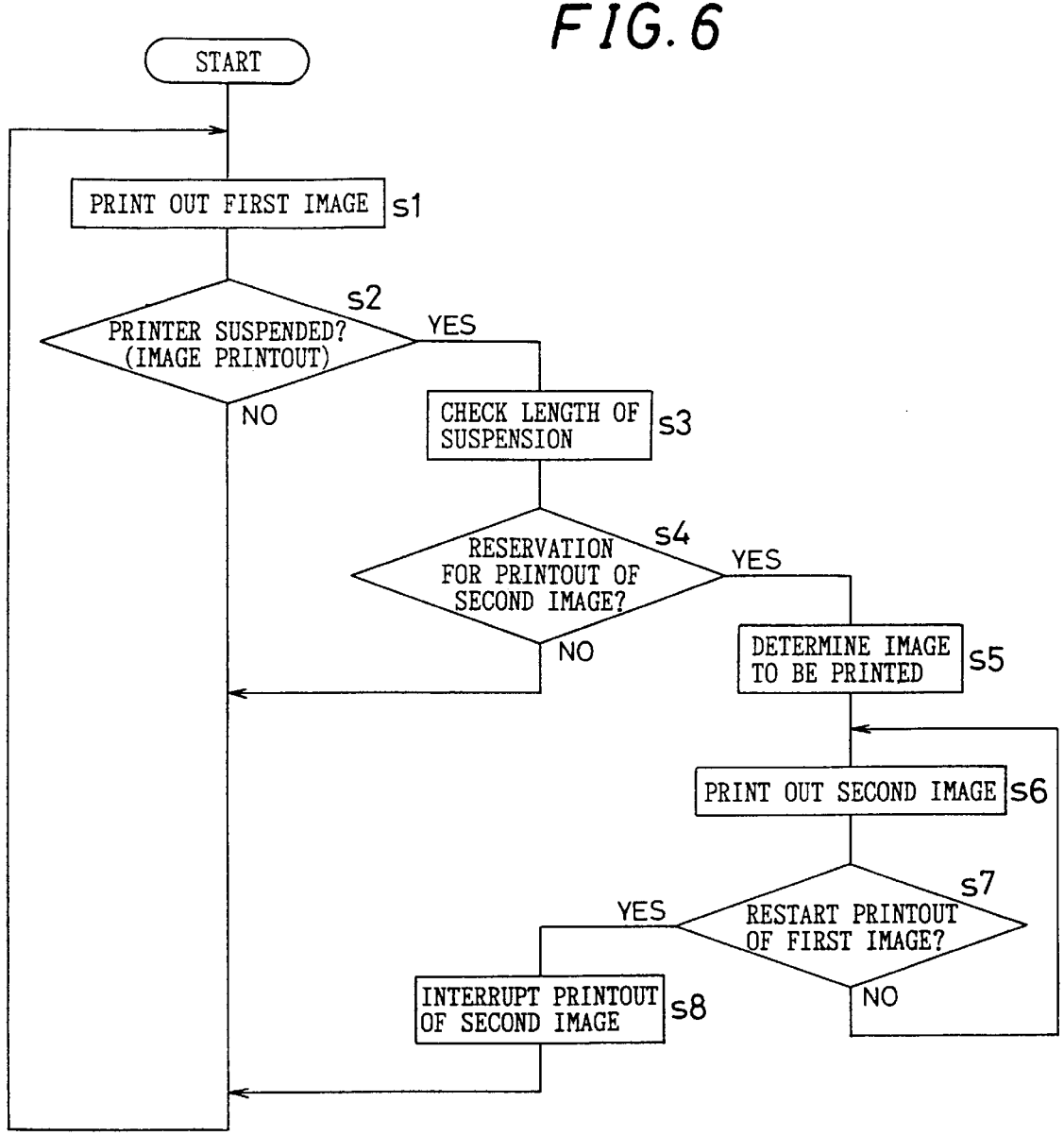
FIG. 6 is a flowchart illustrating an operation of a CPU 44 of the digital copying machine 1.

FIG. 6 is a flowchart illustrating an operation of the CPU 44 of the digital copying machine 1. When it is determined at step S2 that a printer has been temporarily put out of service to suspend the printout of a first image which was started at step S1, then judgment is made at step S3 on what level the printout is suspended. That is, a duration of the suspended period is checked. At step S4, judgment is made on whether or not a reservation is made for a printout of a second image different from the first image. If the reservation is made, the second image to be printed is determined at step S5. At step S6, the second image is processed so as to be printed out during the temporary suspension of the printout of the first image. When it is judged at step S7 that the printout of the first image is restarted, the printout of the second image is stopped at step S8. When it is judged at step S4 that no reservation is made or when the processing of step S8 is completed, the process returns to step S1. When it is judged at step S7 that the printout of the first image is not restarted, the process returns to step S6.

In the operation described above, the suspension of the printout of the first image means a temporary break of a continuous and stable feeding of documents or sheets in a state where the printer is capable of continuing the printout of the image, such as a break of the printout resulting from an operation for changing the document, a break resulting from the transition of copying a first page to copying a second page in the two-side copy mode, a break resulting from the running out of the sheet in the paper feed tray which feeds the sheet and the like.

A length of time in which such stable sheet feeding is interrupted is detected by calculation. On the basis of such calculation result and information on the size of the sheet to be printed, a suitable image to be printed is selected from the reserved image data.

Furthermore, the printout of the image thus selected is effected using a period of time during which the stable feeding of the sheet is interrupted (during an interrupted period of the printout of the first page) while, on the other hand, it is also confirmed that the stable printout of the first image, which has been temporarily suspended, will be effected.

Upon the establishment of the state in which a stable printout of the first image is effected, the printout of the second image is suspended and thus, the printout of the first image is restarted.

Furthermore, when the printer section 3 has completed the printing operation in the copy mode described above to be set in a standby condition wherein the printout of the copy data is not effected and if any of the external terminals A through C transfers the external data accompanied by a request made for the printout, the digital copying machine 1 prints out the transferred external data. Incidentally, as described above, the copy data is obtained by image processing data obtained by the digital copying machine 1 reading an image of a document.

In this case, the external data transferred from the external terminal is expanded into data which can be printed by the printer section 3 of the digital copying machine 1 and then committed to storage in the memory unit 43 whereby the preparation for the printout is completed. When the preparation is completed, the CPU 44 transfers the stored external data from the memory unit 43 to the laser writing unit 30 via the image data output unit 42 on condition that the standby condition of the printer section 3 is confirmed, as described above. Subsequently, the CPU 44 controls the respective loads of the printer section 3 for starting the printing operation. Thus, the printing operation is started to print out the external data from any of the external terminals A through C.

As described above, if the digital copying machine 1 has completed the printout of the copy data of a document in the copy mode so that the printer section 3 is set in the standby condition, the CPU 44 makes a preparation for the printout of the external data from an external terminal. In the case of the external data from any one of the external terminals A through C, the external data is immediately printed. In the case of the printout of the external data transferred from each of a plurality of external terminals, however, the external data is once stored in a preset area of the memory unit 43 for setting the order of priority thereon and thereafter, the external data is printed according to the order of priority thus set.

As to the order of priority, a higher priority is given to the data which requires a longer time to be printed. Out of the plurality of external data from the plural external terminals, the data satisfying the printing condition to be printed by the digital copying machine 1 is first subject to the printing operation prior to the setting of the order of priority. For example, while the external data which requires a longer printing time is printed prior to other external data, the other data may be expanded and stored in the memory unit 43. Accordingly, when the printout of the external data which requires a longer printing time is completed, the succeeding external data is already expanded into data which can be printed by the printer section 3. As a result, the printer section 3 can immediately start the printout of the succeeding external data without interruption. This enhances an operating efficiency of the printer section 3 and contributes to a reduced time for printing all the external data.

On the other hand, the duration of the suspended period of the printer section can be reduced by setting the order of priority after selecting data which satisfies the printing condition. More specifically, a priority is given to the external data the printing condition of which coincides with that of the digital copying machine 1. For example, in the case where certain data specifies a size of paper to be printed, which paper is loaded in the digital copying machine 1, the data is preceded. If the copying machine 1 is not loaded with such paper, the data is given a lower priority. This is because if the copying machine 1 is not loaded with paper of a size specified by the external data, the copying machine 1 is incapable of carrying out a normal printing operation so that the CPU 44 causes the printer section 3 to suspend the printing operation. Therefore, the external data the printing condition of which does not coincide with that of the digital copying machine 1 is excluded from the object of priority. Thus, that data having the printing conditions satisfied by the copying machine 1 is subject to the printing operation according to the order of priority thus set, whereby the suspension of the printer section 3 can be minimized for a higher operating efficiency of the printer section 3.

In the case where the digital copying machine 1 has a stapling and a sorter function but other processing function than the stapling and the sorter function is specified with an external digital device, such external data to which other functions are specified is given a lower priority than the other external data. In the digital copying machine 1 having the sorter function, data to which the sorting function is specified is separated from data to which no sorting function is specified so that the order of priority is set in each group.

Embodiments of the digital copying machine 1 for effecting the image printout, as described above, will be described in sequence by way of modes of carrying out the invention.

First Mode of the Invention

Figure 7:
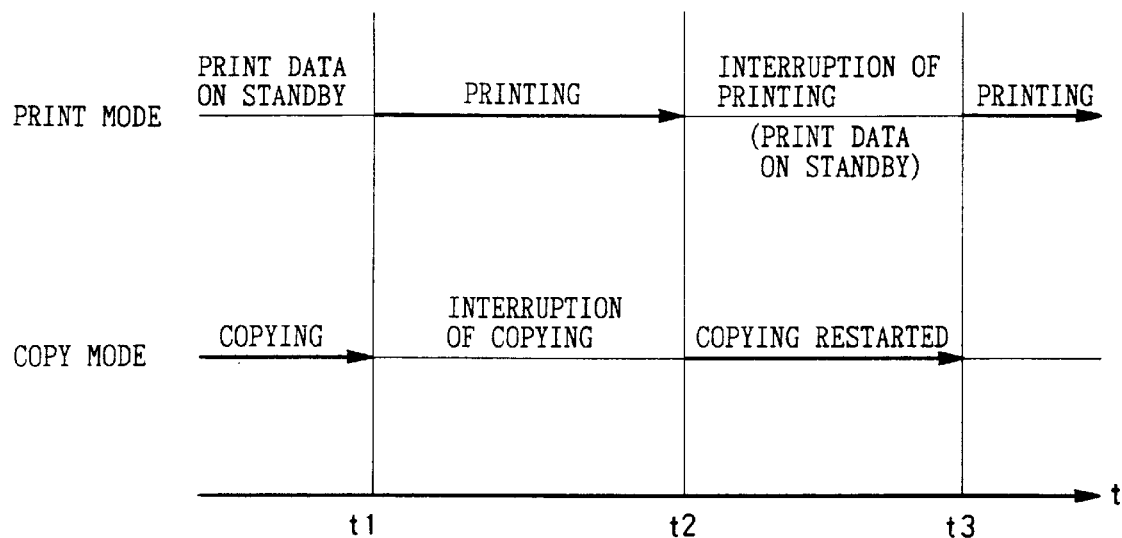
FIG. 7 is a timing chart illustrating a first mode of the invention.

FIG. 7 is a time chart for illustrating an operation of the printer section of the digital copying machine 1 for printing external data transferred from any one of the external terminals A through C. In a state in which the external data and a signal indicative of the printout request are received from any one of the external terminals A through C while the printout of the copy data read by the digital copying machine 1 is underway, the time at which the printer section 3 is suspended is detected by the CPU 44 at time t1. Upon confirming that the expansion of the transferred external data is completed by time t1, or that the external data has been expanded into image data which can be printed by the printer section 3 of the digital copying machine 1, the printout of the transferred external data is effected in the printout mode by the printer section 3 at time t1.

Then, at time t2 when the CPU 44 confirms that the printer section 3 of the copying machine 1 is prepared to start the printout of the copy data in succession, the printing operation in the copy mode is restarted, and this operation is continued until the start time t3 of the next suspension of the printer section 3.

The printout of the external data transferred from the external terminal is started at the start time t1 of the suspended period of the printer section 3 of the copying machine 1 and is interrupted at time t2 when the printer section 3 is prepared to start the printout of the copy data in the copy mode, and more particularly at a suitable time to suspend printing the external data, that is, upon the completion of printing one page of the image information. Alternatively, in order to further enhance the operating efficiency, the printer section 3 may continue printing to complete the printout of the whole transferred external data and thereafter at time t2, the printer section 3 may execute the printout of the copy data.

Here, the external data is printed out in the printout mode at time t1 and t3 and therefore, the printed sheets in this mode are discharged to a discharge tray as separated from the printed sheets of the copy data. Accordingly, the digital copying machine 1 is provided with a discharge tray for receiving sheets printed in the copy mode and an external discharge tray for receiving the printout of the external data from an external terminal, respectively.

As described above, Times t1 and t3, which are the start time of the suspension of the printer section 3, are based on the replacement of documents, reading of the replaced document and the image processing, or a trouble such as involving the ADF 21 or the scanner section 2, and the scanner unit 22 in particular. Time t2, the start time of printing the copy data is based on a state where reading and processing of an image of a replaced document have been completed, as described above, thereby allowing the start of the printout of the resultant copy data, or a state where a trouble in the ADF 21 or the scanner section 2 is removed thereby allowing the start of the printout of the copy data while the printout of the external data has been completed or may be suitably interrupted in the course, more specifically, when the printout of one page portion of the external data has been completed.

Second Mode of the Invention

This mode of the invention is arranged such that after assigning an order of priority to the external data transferred from external terminals, the copying machine effects the printout of the external data from the external terminals. In other words, the order of priority is set among the external data transferred from a plurality of external terminals A through C, for example, whereby the printing operation is carried out according to the order of priority thus set.

In setting the order of priority for improving an operating efficiency of the printer section 3 of the digital copying machine 1, the top priority is given to data to be printed on sheets having the same size with copies produced in the copy mode before the printer section 3 enters the suspended period during which the printer section 3 is unable to continue the operation in the copy mode. As already described, the suspended period is associated with the image processing necessitated by the document replacement and a trouble occurred in the ADF 21 or the scanner section 2. If the external data is to be printed on sheets having the same size, the sheet feeding section can continue to feed the sheets without switching to sheets having another size and thus, time required for switching sheet sizes may be saved. This allows a sheet having the same size to be fed to a registration roller in advance, so that the printer section 3 can continue to print the external data from the external terminal.

Figure 8:
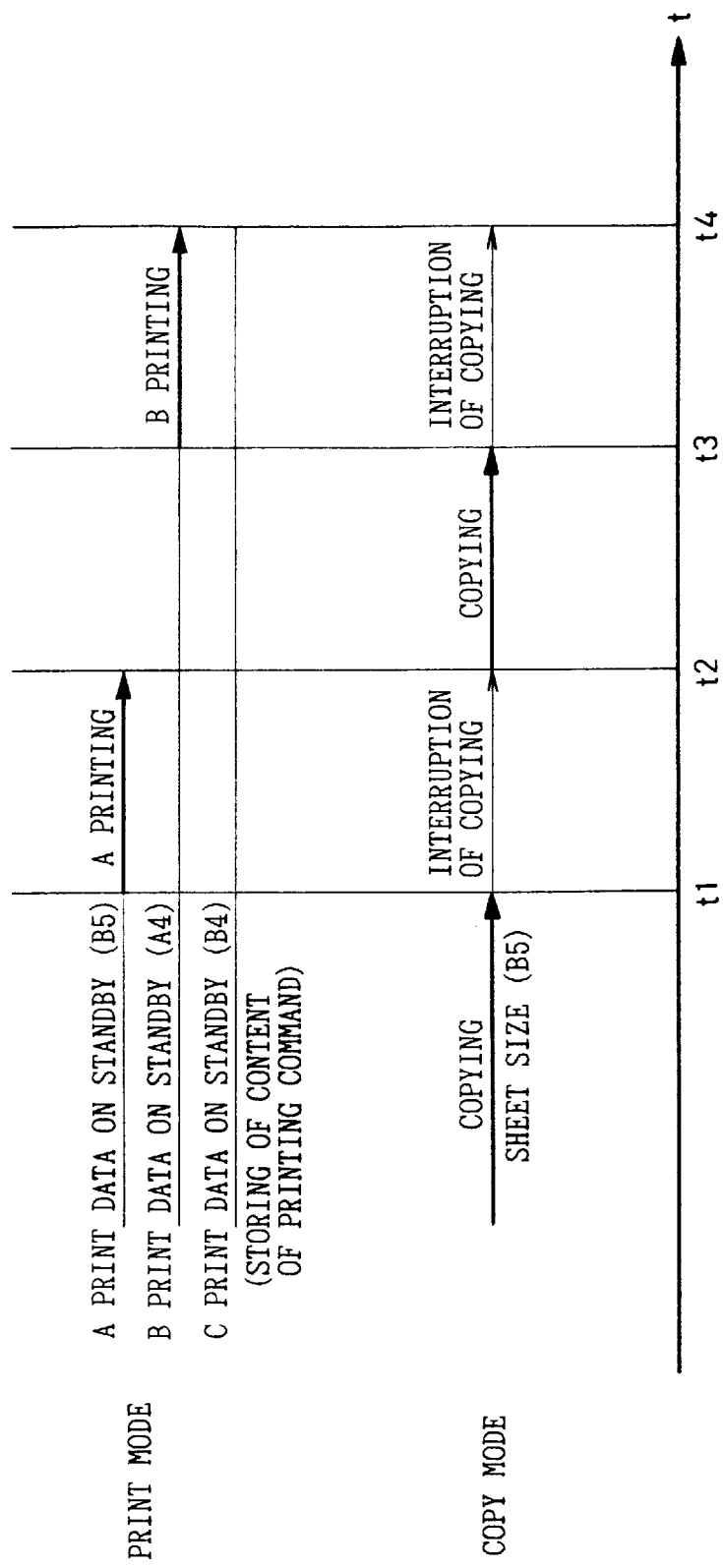
FIG. 8 is a timing chart illustrating a second mode of the invention.

Then, in FIG. 8, it is assumed, for example, that external data from the external terminal A is to be printed on B5 sheets, the external data from the external terminal B is to be printed on A4 sheets and the external data from the external terminal C is to be printed on B4 sheets. On the other hand, it is assumed that the digital copying machine 1 is printing an image on B5 sheets in the copy mode.

As shown in FIG. 8, the digital copying machine 1 continues printing the copy data until time t1. Then, in response to the detection of the start time (time t1) of the suspended period of the printer section 3, the copying machine 1 gives a priority to print the external data (A) from the external terminal A. For achieving a higher operating efficiency, the copying machine 1 continues the printing operation to complete the printout of the data. If the start up is completed in preparation for the printout 5 in the copy mode by time t2 when the printout of the external data (A) is completed, the printing operation in the copy mode is restarted.

Subsequently, at time t3 when the copying machine 1 suspends again the printing operation in the copy mode, the printout of the external data (B) from the external terminal B is started. If the digital copying machine 1 has B5 and A4 sheets loaded in the sheet feeding cassettes 34a and 34b, respectively, it is naturally impossible for the copying machine, as it is, to carry out the printout of the data from the external terminal C. Hence, the printer section 3 of the digital copying machine 1 is caused to print the external data (B) from the external terminal B. Similarly, when the printout of the external data (B) is completed, the printing operation in the copy mode is restarted at time t4. It is provided that the printout should be started at time t4 when the preparation has been made for printing the copy data of the document.

At this time, the printing operation is not started although the external data is received from the external terminal C. Upon the completion of the printout of the data from the external terminal B, the digital copying machine 1 presents a message suggesting loading sheets for receiving the data from the external terminal C in the main body of the digital copying machine 1. It is rather disadvantageous for the digital copying machine 1 to replace B5 sheets used in the copy mode with B4 sheets because a successive operation in the copy mode becomes impossible. Accordingly, the copying machine 1 presents a massage to replace the cassette of A4 sheets with a cassette of B4 sheets.

Incidentally, in setting the order of printing priority of the external data received from the external terminals A through C, as described above, the top priority is given to the printout of the external data (A) having the same size as the size used in the copy mode. Assigning a priority to the other external data depends upon the size of sheets loaded in the digital copying machine 1. However, the order of priority may be set rather based on the availability of processing functions of the copying machine 1 than the sheet size. In the case where the external data to which a staple processing is specified and which cannot be processed by the digital copying machine 1, for example, such external data is excluded from an object of the priority, thereby preceding the other data having the printing condition met by the digital copying machine. This allows the digital copying machine 1 to select a required function for processing without interrupting the printing operation of the printing section 3.

In the case where the digital copying machine 1 prints out the external data transferred from external terminals, as described above, the external terminals are unable to sufficiently grasp the available processing functions of the copying machine 1. Since the external terminals are physically spaced from the digital copying machine 1, some external terminal may specify an unavailable function. The copying machine 1 puts off the printout of data from such an external terminal. The copying machine 1 informs such an external terminal of the unavailability of the specified function and starts the printing operation in accordance with the order of priority as described above with the specified function canceled.

Consequently, when the external data from an external terminal A has a printing condition satisfied by the digital copying machine 1, a top priority is given to the printout of the external data A to carry out the printing operation at the start time of the suspended period of the printer section 3 of the copying machine 1. This eliminates the suspended period of the printing operation of the printer section 3, thus contributing to a higher operating efficiency.

Third Mode of the Invention

Subsequently, a description will be made on how the copying machine 1 processes the external data from external terminals in the case in which the printer section 3 becomes unable to continue the ongoing printing operation in the copy mode not because of the occurrence of trouble therein.

In the first and the second mode of the invention described above, the external data from the external terminals is printed in the state where the printer section 3 can continue the printing operation as long as data to be printed exists, and more particularly at the start time of the suspended period during which the printer section 3 is unable to continue the printing operation in the copy mode because of the exchange of documents, or the occurrence of trouble in the ADF 21 or the scanner section 2. However, there is a case in which the printer section 3 becomes unable to continue the printing operation because of the other trouble than those occurred in the printer section 3 as described above. That is, a case in which sheets fed to the printer section 3 run out during the printing operation.

Figure 9:
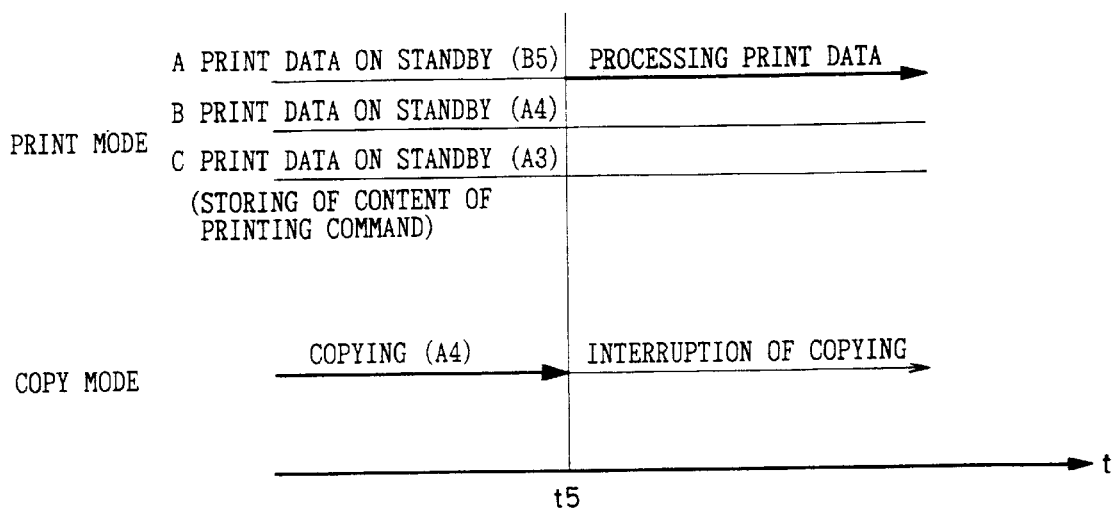
FIG. 9 is a timing chart illustrating a third mode of the invention.

Now referring to FIG. 9, while the digital copying machine 1 carries out the printing operation in the copy mode, the external data is transferred from the external terminals A through C, respectively, expanded into data which can be printed by the printer section 3, and committed to a temporary storage in the memory 43. At time t5 when the copying machine 1 runs out of A4 sheets used for the printing operation in the copy mode, the printout of the external data (A) from the external terminal A, for example, is effected.

In other words, the time when A4 sheets to be fed runs out, it becomes impossible to continue the printing operation in the copy mode. If the printer section 3 is capable of carrying out the printing operation and data to be printed exists, the printer section 3 can print on sheets an image corresponding to the data. At time t5, the CPU 44 determines that the printer section 3 has entered the suspended period, allowing the printer section 3 to start the printout of the external data (A) from the external terminal A from time t5.

The reason for giving a priority to print the external data (A) from the external terminal A is because the copying machine cannot carry out the printout on A4 sheets, having run out of A4 sheets during the operation in the copy mode whereas the copying machine is not loaded with B4 sheets for receiving the external data (C) from the external terminal C.

As described above when the printout of the external data (A) from the external terminal A has been completed, and if the main body of the copying machine 1 is replenished with A4 sheets, the printout on A4 sheets in the copy mode is restarted. However, if the copying machine 1 is not loaded with sheets of a required size, the printer section 3 is suspended. At the time when B4 or A4 sheets are loaded in the copying machine, the machine 1 effects the printout of data corresponding to the sheet size loaded therein. Thus, the duration of the suspended period of the printing operation in the printer section 3 is minimized for improving the operating efficiency.

Fourth Mode of the Invention

The foregoing is the description made on the modes of carrying out the printout of the external data from the external terminals from the start time of the suspension of the printer section 3, the external data being received while the digital copying machine 1 is printing the copy data obtained by reading an image of a document.

However, the digital copying machine 1 does not always carry out the printing operation at the timing described above. There may be a case where in the suspended period during which image data obtained by reading an image of a document are image processed into copy data to be stored in the memory unit 43, an external terminal transfers the external data accompanied by a printout request. In this case, the printer section 3 is not executing the printing operation in anyway, or is in suspension. Accordingly, if the external data from the external terminal is already expanded to be able to be printed by the printer section, the printer section 3 effects the printout of the external data in the printout mode.

Figure 10:
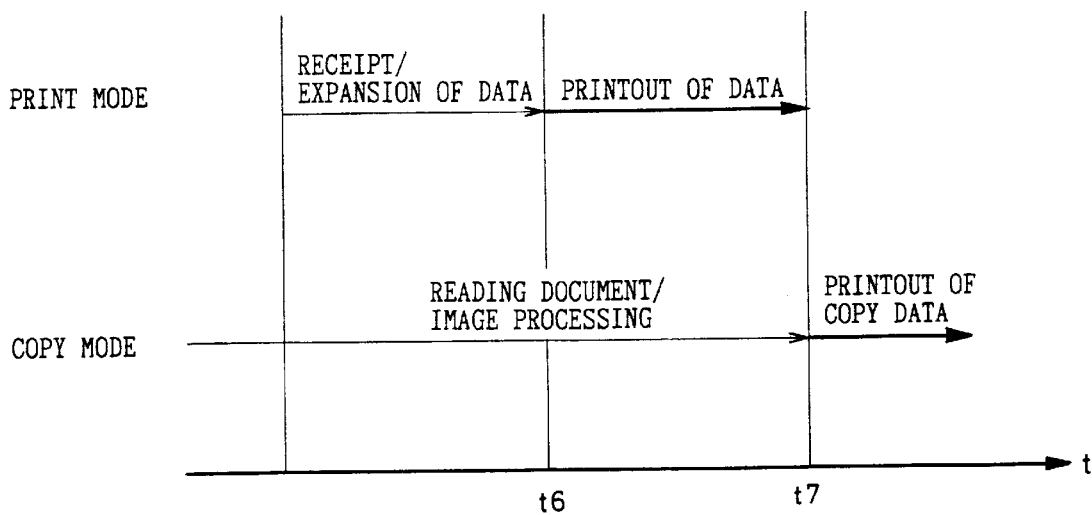
FIG. 10 is a timing chart illustrating a fourth mode of the invention.

As shown by an example of FIG. 10, while obtaining the data by reading an image of a document and image processing the read data into copy data which can be printed out by the printer section 3, the copying machine receives the external data from any one of the external terminals and expands the external data into data which can be printed by the printer section 3. In this period, either of the data which is prepared earlier is preceded in the printing operation by the printer section 3.

In the case where a document includes a photographic image, a time longer than normal may be required for image processing data into copy data to be printed by the printer section 3. Accordingly, if the expansion of the external data from the external terminal has been completed at time t6, the printer section 3 carries out the printing operation in the printout mode because the external data is prepared earlier than the copy data. Thereafter, if the printout of the external data is completed and the data is obtained by reading an image of a document have been image processed into the copy data, the printout of the copy data is started at time t7.

The expansion of external data into data to be printed by the printer section 3 includes steps of interpreting page description language (PDL) and the like which is transferred from an external terminal and converting the data into bit data to be printed by the printer section 3 by means of the image processing unit. For reducing time to transmit data, the external terminal may sometimes transfer compressed data. The compressed data is reconstituted and converted into bit data which can be printed by the printer section 3. A process for printing characters and symbols may sometimes include a conversion into bit data of the code data which are transferred for reducing the transmission time.

Fifth Mode of the Invention

Instead of data as described above, an external terminal may transfer bit data which can be committed to storage in the printer section 3 in advance. In this case, by storing the data as it is, the printing operation can be started by means of the printer section 3.

Here, the digital copying machine 1 carries out the steps of obtaining data by reading an image of a document, image processing the read data, and converting the data into copy data, which steps take a considerable amount of time. Besides, the steps are performed for each document. In contrast, the external data transferred from an external terminals do not require a reading step and only requires a step to expand the transferred data into executable data. Hence, by giving priority to data transferred from external terminals, the digital copying machine 1 can increase the operating efficiency of the printer section 3.

Figure 11:
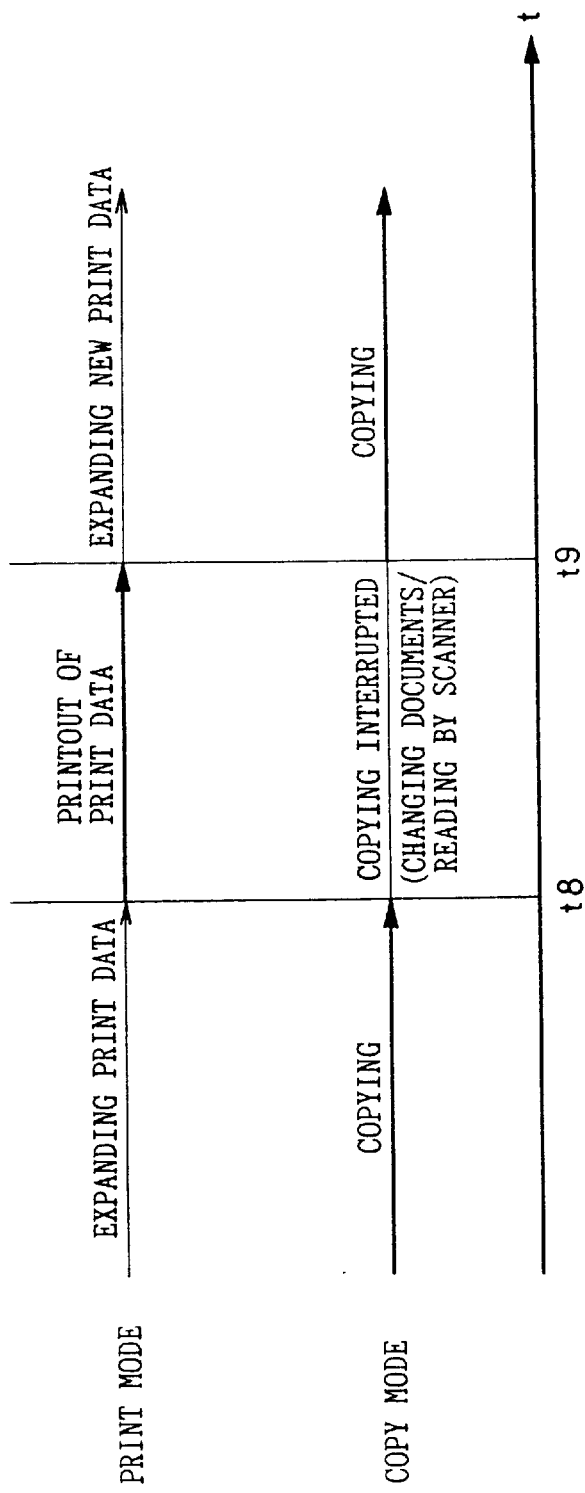
FIG. 11 is a timing chart illustrating a fifth mode of the invention.

More specifically, as shown in FIG. 11, during the printing operation in the copy mode (a copying operation), external data is transferred from an external terminal and the external data is expanded. At time t8 when the data expansion is completed, the copying machine 1 is switched from the copy mode to the printout mode. The switching is effected to the time when the printout of one sheet in the copy mode is completed. In this state, the printout of the copy data is temporarily interrupted. Then from time t8, the printout of the external data is started. Upon the completion of this operation at time t9, the copying machine is switched to the copy mode so as to restart the printout of the copy data from where it was interrupted.

If new external data is transferred from another external terminal during the printing operation in the copy mode, the external data is expanded. Upon the completion of the data expansion, the copying machine is switched to the printout mode to effect the printout of the external data in the manner described above.

The digital copying machine 1 cannot effect the printout of the copy data during the operation of printing the external data in the printout mode, particularly in a period from time t8 to time t9. Fortunately, the copying machine can activate the scanner section 2 to carry out steps concurrently with the printout mode operation, which steps include reading of the succeeding document, image processing the read data into copy data, and successively committing the processed data to storage in the memory unit 43. This allows the printout of the copy data prepared by image processing the read data to succeed the completion of the printout of the external data in the printout mode.

Here, during the interruption of the printing operation in the copy mode, reading of an image of a document is performed concurrently with the printout of the external data. It is to be noted that the reading is performed on other document than the document the reproduction of which is interrupted. Accordingly, the document is changed by the ADF 21 or manually, and the data is obtained by reading a new document and converted into the copy data which are successively committed to storage in the memory unit 43. Hence, by using the ADF 21 and the like, an image of a document may be read to obtain data to be stored in advance so that upon the completion of the printout of the external data, the printer section 3 can successively effect the printout of the copy data which is thus prepared.

As described above, in either printing mode of the printer section 3, the expansion of the external data or the image processing of read data can be performed concurrently with the printing operations. Hence, the operating efficiency of the printer section 3 can be further increased. In addition, as described with reference to the first through third modes of the invention, an even higher operating efficiency will be achieved if switching from the copy mode to the printout mode is timed to the completion of an ongoing printing operation. More specifically, instead of switching the printing modes upon completion of the expansion of external data, an ongoing printing operation in the copy mode are continued so that the modes may be switched when the printing operation are interrupted.

Sixth Mode of the Invention

Figure 12:
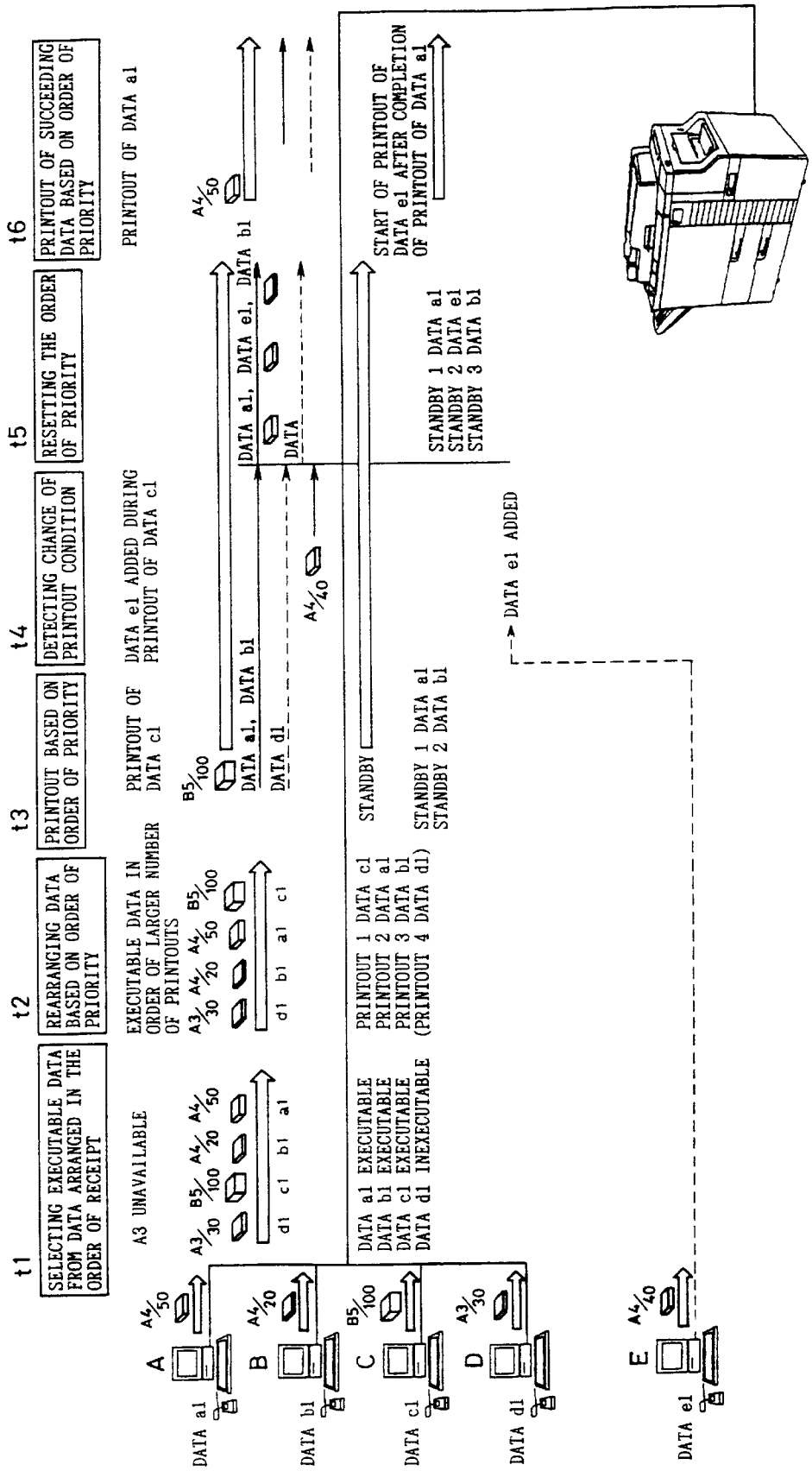
FIG. 12 is a timing chart illustrating a sixth mode of the invention for setting an order of priority.

FIG. 12 illustrates a state where external terminals A through D transfer the respective external data to the digital copying machine 1. The respective data including the printing condition are committed to storage in the respective areas in the memory unit 43. An order of priority is set depending on the respective data thus stored, which are transferred to the printer section 3 in the order of decreasing a priority given to the printout thereof.

In FIG. 12, in the case where external data a1 are firstly transferred from an external terminal A, secondly external data b1 from an external terminal B, thirdly external data c1 from an external terminal C and fourthly external data d1 from an external terminal D to the digital copying machine 1 by means of a communication line 48 at time t1, the digital copying machine 1 first selects executable data from the external data a1 through d1. The selection is based on a judgment passed on, for example, whether the respective external data specify a sheet size loaded in the digital copying machine 1 or not.

Assuming that the respective sheet feeding cassettes 34a–34b of the digital copying machine 1 contain B5 and A4 sheets at the present stage, the digital copying machine 1 is unable to print the external data d1 from the external terminal D specifying A3 sheets. Accordingly, the external data d1 are left off and the other executable external data from the external terminals is selected.

Next, at time t2, an order of printing priority is set among the executable external data a1 through c1. In this case, the top priority is given to data producing the largest number of printouts or requiring the greatest amount of time for printing. The top priority is given to the external data c1 from the external terminal C producing 100 printouts. The second highest priority is given to the external data a1 from the external terminal A producing a greater number of printouts than the external data b1 from the external terminal B. Thus, the priority is assigned in the order of the external data c1, a1, b1 and the external data d1 which can be processed at the present stage.

With the order of printing priority thus set, the printout of the external terminal data c1 from the external terminal C is started at time t3. In order to effect the printout, the digital copying machine 1 expands the external data into data which can be printed by the printer section 3 and successively commit the resultant data to temporary storage in the memory unit 43. When the expansion of data is completed, or at least one sheet of data is expanded into bit data, for example, which are transferred to the printer section 3 to start the printing operation. During the printing operation, the rest of the external data c1 are successively expanded into bit data, followed by the other external data a1 and b1. The resultant data is successively committed to storage in the memory unit 43.

By assigning a higher priority to external data producing a greater number of printouts, which data is executable by the digital copying machine 1, the digital copying machine 1 can utilize the printing time of the external data for concurrently expanding the other external data into data executable by the printer section 3. This eliminates the need to interrupt the printing operations of the printer section 3 to wait for the expansion of the succeeding data, thereby allowing for the continuous printing operation. As a result, the continuous printing operations increases the operating efficiency for a reduced time required for printing all the external data.

If, on the other hand, new external data e1 are transferred from an external terminal E during the printout of the external data c1 from the external terminal C, priorities are reassigned to the respective external data a1, b1 and e1 at time t5 concurrently with the ongoing printing operations. In setting the order of a priority, judgment is first made on whether the new external data is executable by the digital copying machine 1 or not. If the external data e1 is to produce 40 printouts on A4 sheets, the external data e1 is given a printing priority lower than the external data a1 but higher than the external data b1. Thus, the priority on the remaining data yet to be printed are set in the decreasing order of a1, e1 and b1 and the external data d1 inexecutable at the present stage are left off.

After setting the order of priority as described above, the printout of the external data is successively executed from time t6 in accordance with the order of priority thus set. While executing the printout of the external data b1, the digital copying machine 1 presents a message to the load A3 sheets in the place of the sheet feeding cassette 34*a* or 34*b* which is not feeding A4 sheets for receiving the external data b1 to thereby allow the printout of the external data d1. By loading A3 sheets in the copying machine according to the message, the disability of printing the external data d1 is eliminated. After the completion of the printout of the external data b1, the printout of the external data d1 is started.

Incidentally, at the time when the printout of the external data d1 becomes possible, the external data d1 producing a greater number of printouts should have a higher priority than the external data b1. However, the printout of the external data b1 is already started. In this case, the printout of the external data b1 must be temporarily interrupted to start the printout of the external data d1. If it is to be done, the printer section 3 must temporarily stop its operations while time is required for expanding the external data d1 into data executable by the printer section 3. This will result in a decreased operating efficiency of the printer section 3. Hence, it is most preferred to give priority to the ongoing printing operation and to reassign the priority to the remaining data which are to be successively subject to the printing operation according the order of priority thus set.

If prior to the execution of the printout of the external data b1, the digital copying machine 1 is ready to effect the printout of the external data d1, comparison on the number of printouts is made between the external data b1 and d1. Consequently, the external data d1 producing a greater number of printouts are preceded and thus, the printing operation is executed in the order of the external data d1 and b1. As described above, when the digital copying machine is loaded with sheets of the size specified by the external data d1, the printout of the external data d1 becomes possible. Upon completion of the printout of the external data c1, the digital copying machine 1 can present a message to load A3 sheets in the place of the sheet feeding cassette 34*a* or 34*b* which contains A4 sheets because only A4 sheets are not specified by the external data to be printed. The time when A3 sheets are loaded in the copying machine according to the message, the external data d1 becomes executable and therefore, reassignment of the printing priority is executed. It is to be noted here that the order of priority is not set among those data including data already subject to the printout processing but among the remaining standby data to be printed.

Figure 13:
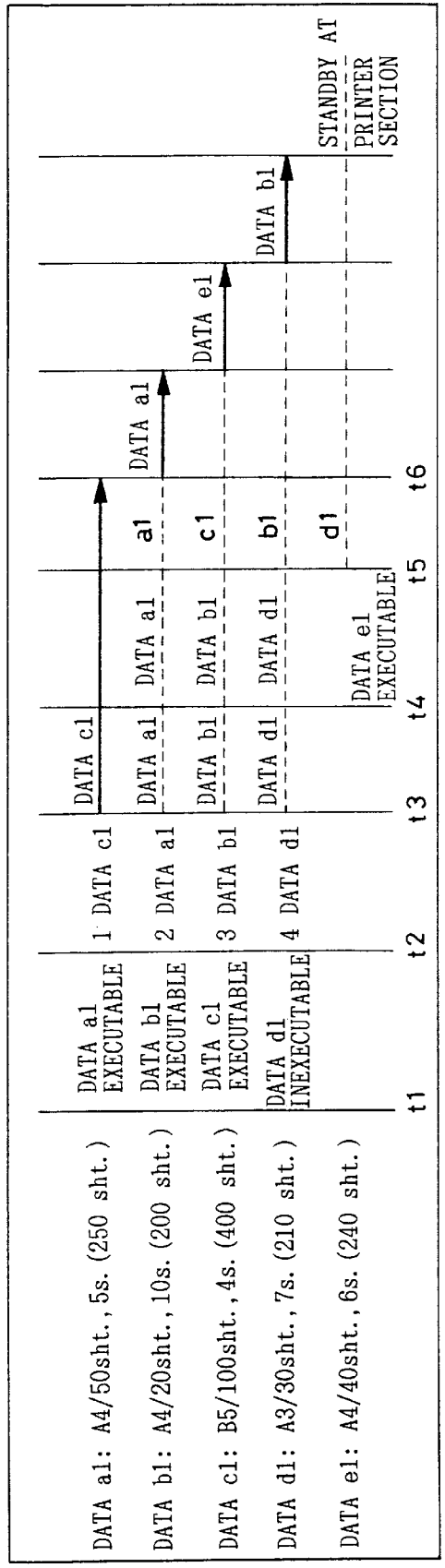
FIG. 13 is a timing chart illustrating an elapsed time in a printout processing on the basis of the order of priority of FIG. 12.

FIG. 13 is a time chart for illustrating the procedure for printing out the external data according to the order of priority on the external data of FIG. 12. In the chart, as described above, any external data specifying the printing conditions satisfied by the digital copying machine are selected (t1) from the external data a1 through d1 transferred from the respective external terminals A through D; the order of priority is set among the executable external data a1 through c1 (t2); the printout of the external data c1 is executed (t3) according to the order or priority thus set; and in the state (t4) where a new external data is transferred during the printout processing, a judgment is made on whether the new external data is executable or not. Thereafter, the order of priority is reset (t5) among the external data other than the data under process so that the printing operation is executed (t6) according to the order of priority thus set.

In setting the order or priority, comparison on the number of printouts is made between the respective external data to give a higher priority to data producing a greater number of printouts which require a longer processing time between the data expansion and the completion of the printout. That is, a greater number of printouts to be produced require a greater amount of time for the data expansion and printout. Thus, provision is made such that data requiring a greater processing time in total are given the higher priority. Setting of the conditions for the order of priority is as described in the foregoing. Longer processing time allows the expansion of the remaining external data concurrently therewith. This enables the printing operations to proceed successively, thus eliminating the suspension of the printer section 3 for a notable increase in the operating efficiency.

Additionally, in setting the order of priority as described above, external data directly subject to the printing operation of the digital copying machine 1 are selected in priority. Executable data is assigned the priority in the manner as described above. If a higher priority is given to data which are not executable by the digital copying machine 1 as they are, the printing operation of the printer section 3 must be interrupted before the printout of such data is started. The interruption continues until the digital copying machine 1 is set to conditions for printing such external data, which results in the waste of time. This leads to a reduced operating efficiency of the printer section 3 and a longer time required for printing all the external data.

In setting the order of priority, it is also important to consider an easy separation of printout of the respective external data from each other. For example, it is desirable to provide discrete discharge trays for separately receiving the printouts of the respective external data from the external terminal A through E. For this purpose, the digital copying machine 1 may be provided with a number of discharge trays.

In the case where the digital copying machine 1 includes a sorter, the sorter may be utilized for dedicating trays to the external terminals A through E, respectively, to discharge printouts as sorted. Some external data specify post-processing which includes, for example, stapling or sorting.

In the case where the printing conditions of external data specify 10 sets of 20 printouts, for example, 10 sets of printouts must be sorted in the order of pages. Accordingly, printouts of the external data is distributed to respective trays, that is, 20 printouts are discharged to 10 trays, respectively. Assuming that the external data c1 and b1 specify the sorting process while only the external data a1 do not specify the sorting process, no problem exists when the number of trays for sorting exceeds the number of sets of printouts of the external data c1 or b1. However, the number of the trays is equal to that of the sets of printouts, the printouts of the external data a1 are interposed therebetween and hence, the separation of the printouts of the external data a1 is very difficult. Particularly when the number of the trays is smaller than that of sets of printouts to be sorted, all the printouts failing to be sorted are discharged to a specific tray.

In the above described case, data specifying the sorting process is separated from data not specifying the sorting process before the data is subject to the printout processing. More specifically, if the external data c1 of the top priority specify the sorting process, the priority is given to the sorting process. For example, if the external data b1 specifies the sorting process, the second priority is given to data b1 so that the external data a1 not specifying the sorting process are left off. In this manner, the printouts of the external data a1 are discharged only to a specific tray so that the printouts of the external data c1 or b1 previously sorted are readily separated from those of the external data a1 and therefore, the workability is increased.

According to the foregoing explanation, a priority is given to data subject to the sorting process, but this is only because the top priority is given to the external data c1 which requires a great amount of time for the completion of the printout thereof. Accordingly, in the case where the external data c1 do not specify the sorting process, the external data a1 not specifying the sorting process may be preceded to the external data b1 specifying the sorting process. This may prevent the unsorted printouts of the external data from being interposed between the sorted printouts and hence, the separation of the unsorted printouts is easy.

Instead of preceding data specifying the same post-processing as external data given the top priority or preceding data not specifying a post-processing similarly to external data of the top priority, those data specifying a post-processing are previously separated from data not specifying the post-processing so that an order of priority may be set among data thus separated. In this case, data requiring the post-processing may be preceded to those not requiring the post-processing and assigned a priority respectively, or vice versa.

In short, a higher priority may be given to data in such a manner as to improve the operating efficiency of the printer section 3 during the printout of the external data. If the separation of data to be post-processed from those requiring no post-processing does not affect the operating efficiency of the printer section, an importance should be attached to an easy separation/collection of the resultant printouts.

Seventh Mode of the Invention

As shown in FIGS. 12 and 13, the external data d1 are given the lowest priority because the data cannot be printed by the digital copying machine 1 at the present stage. In the case where the digital copying machine 1 is not loaded with sheets of a desired size, the copying machine becomes available at the time when sheets of the desired size are loaded therein. However, in the case where data specifies a condition which cannot be processed by the digital copying machine 1, the machine cannot output data. To avoid this situation, the copying machine is adapted to provide printouts on the basis on the closest condition to the specified condition.

FIG. 14 shows an example thereof. As shown in FIG. 14, external data d2 transferred from the external terminal D specifies the printout on A4 sheet, two-sided copy, 5 sets of 20 printouts, and stapling process, for example. On the other hand, A4 sheets and two-side copying and sorting functions are available but a stapling function is unavailable in the digital copying machine 1. In this case, the external data d2 are judged inexecutable to be set to the lowest place in the order of priority. In addition, with the stapling process specified, which is inexecutable, the data will be permanently left off.

In order to solve this problem, the copying machine having the sorter substitutes the stapling process with a sorting process in which the printouts are sorted. Substitution of the stapling process with the sorting allows the user to readily staple the sorted printouts. Thus, the inexecutable situation is eliminated whereby printouts are produced in a state closest to the specified conditions.

Furthermore, in the case where printouts on A3 sheets are required of the digital copying machine 1 adapted to process sheets up to the size of B4, if the copying machine has a reduction/magnification function, the copying machine can reduce an image of external data for producing printouts of other sheet size such as B4 to produce printouts in a closer state to the specification. On the other hand, in the case where sizes of sheets loaded in the copying machine do not coincide with a specified sheet size and the copying machine does not have a reduction/magnification function, a sheet size of one grade higher than the specified sheet size may be selected for producing printouts.

Furthermore, in the case where 5 sets of sorted printouts are required of the copying machine which does not have the sorting function, instead of producing 5 printouts of the same page at a time, prints are produced in the order of pages to be sequentially discharged to one tray. The operation is repeated five times in a cyclic manner, stacking the resultant printouts on the other. Thus, the printouts can be processed in the similar manner to the sorting function. Furthermore, if the copying machine is incapable of producing two-sided copies, the coping machine may be operated so as to discharge a sheet printed on one surface thereof at a time.

As described above, in the case where external data specifies a condition which cannot be processed by the digital copying machine 1, the printout of the data may be effected when such a condition is satisfied if it is possible to wait for the condition being satisfied. In the case where it is impossible to satisfy the condition, however, the condition may be altered to a most close condition to that which is specified, based on which the printout thereof may be executed. This allows the copying machine to print all the external data, thereby eliminating the standby state in which data is not waited in a state inexecutable by the digital copying machine 1. Hence, the operating efficiency of the printer section 3 can be enhanced.

Eighth Mode of the Invention

This mode of the invention allows for an arbitrary change of an order of priority when the printout processing is carried out according to the order of priority set as described above. More specifically, there may be a case where the external data is transferred from an external terminal, requiring an immediate printout thereof. If, in this case, the external data is given a lower priority, the external data must wait for a long time till it is printed out. For eliminating such a disadvantage, the mode provides an arbitrary change of the order of priority once set.

Consequently, the display unit 6 in the control panel 45 of the digital copying machine 1 displays the order of priority on the respective external data together with the printing conditions thereof, such as the sheet size, the number of printouts (the number of sets of printouts, if necessary), the post-processing and the like. The post-processing includes a stapling process, a sorting process and the like.

Figure 15A:
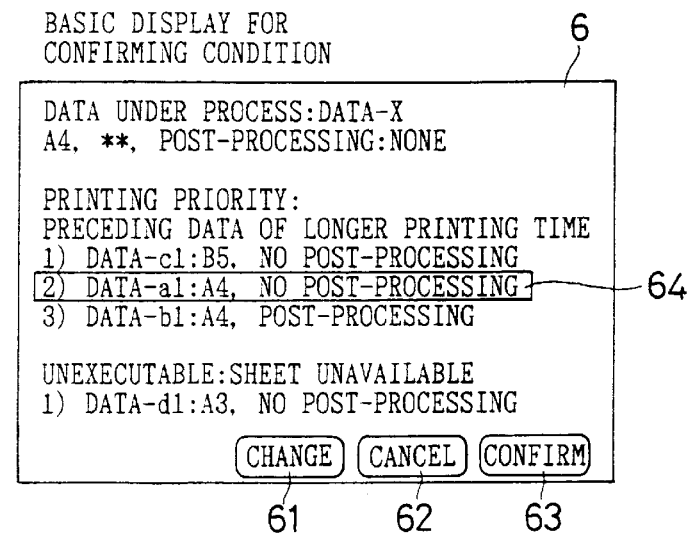
FIG. 15A showing an example of the display for changing an initial setting.
Figure 15B:
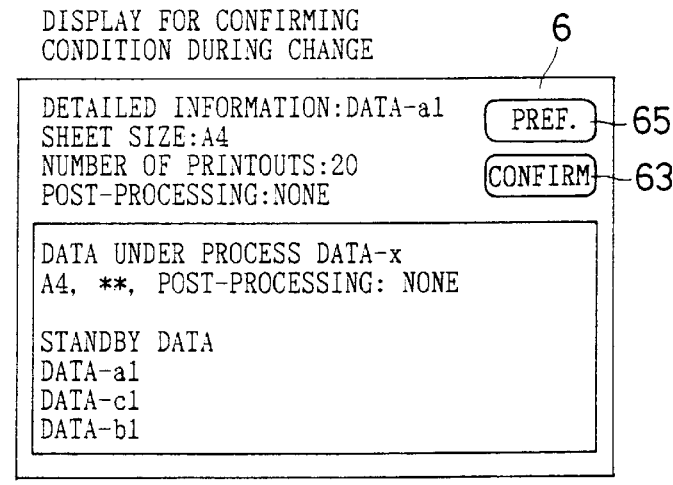
FIG. 15B showing an example of the display for confirming an operation for changing the order of priority.
Figure 15C:
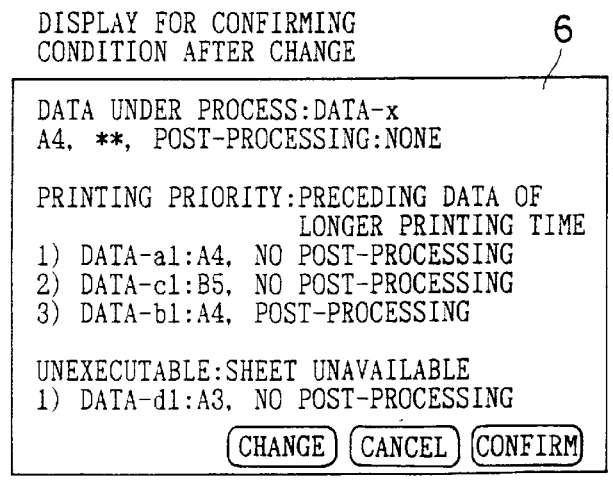
FIG. 15C showing an example of the display of the setting after the order of priority is changed.

FIGS. 15A through 15C give an example of the content presented by the display unit 6, respectively. FIG. 15A provides a display for checking the order of priority having been set among external data a1 through d1 transferred from the respective external terminals, as described with reference to FIG. 7. This example shows a state where the printout of external data x is already underway. There is shown the order of priority on data to be printed after the completion of the printout of the external data x, wherein data which requires longer processing time is given a higher priority.

When it is desired to change in the order of priority assigned to the standby data, such change can be effected by touching a "change" portion 61 in the display unit 6. The display unit 6 is of, for example, a liquid crystal display with a transparent touch panel overlaid thereon through which a control command displayed thereon can be inputted. A conventional device may be employed as such control means.

By touching the "change" portion 61 of the display unit 6, a portion of data to be preceded is framed in line 64. Touching the "change" portion 61 several times cause the frame 64 to descend sequentially to the lowermost place from which the frame is moved to the uppermost place in a cyclic fashion. In order to precede the printout of desired external data, data a1 for example, the setting is so made as shown in FIG. 15A, followed by touching a "confirmation" portion 63. On the other hand, when there is no need to change the order of priority, touch a "cancel" portion 62 in the display unit 6 to erase the frame 64 so that the printout processing is carried out according to the initial order of priority.

After selection of the desired external data a1 through operation of the "change" portion 61, the "confirmation" portion 63 is manipulated to change the content of display of the display unit 6 to that shown in FIG. 15B. More specifically, the display unit indicates details of the printout of the external data a1 selected through the changing operation, along with the data in the process and the changed order of priorities on the standby data including the external data a1. If, in this state, it is desired to actually give the priority to the printout of the external data a1, a "priority" portion 65 is manipulated, followed by touching the "confirmation" portion 63 and thereafter, the display returns to the initial screen where the changed order of priority is presented. After the changing the operation, the digital copying machine 1 causes the printer section 3 to carry out the printing operation according to the displayed order of priority.

Ninth Mode of the Invention

Subsequently, in the state where the order of priority is set or changed as described above, the digital copying machine 1 sequentially carries out the printing operation according to the order of priority. If any trouble occurs in the printer section 3 during the printout processing, the trouble temporarily suspends the printing operation. The suspension continues until the trouble is removed, thus resulting in an decreased operating efficiency of the printer section 3.

As such trouble, there may be a case in which sheets to be printed run out during the printing operation so that it becomes impossible to continue the printout on sheets of the size. Additionally, there may be a case where when staples run out during the stapling process specified by the external data, the printing operation of the printer section 3 is suspended because the stapling process is impracticable. However, such troubles do not result from the failure of the printer section 3, which is able to carry out the printout on sheets of another size or the printout of external data not specifying the stapling process.

Accordingly, when the CPU 44 detects the occurrence of such trouble as above, the CPU 44 gives a priority to and select from the standby external data, such data as produce printouts on another sheet size or do not require the stapling process. That is, at this time, the CPU 44 temporarily saves the order of priority so set and sets a new order of priority. The former order of priority is temporarily saved because the remaining printouts thus interrupted become executable when sheets of a desired size or staples are replenished.

Thus, when the occurrence of trouble such as the machine running out of sheets or staples, the suspension of the printer section 3 can be reduced by moving up the external data executable at the stage. This prevents a decrease in the operating efficiency of the printer section 3.

Figure 16:
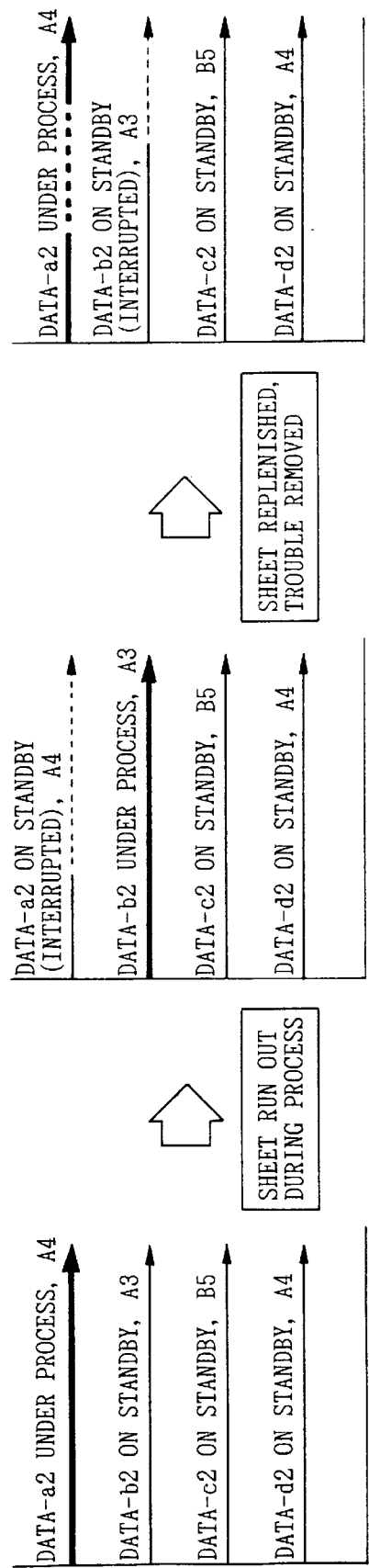
FIG. 16 is a timing chart illustrating the ninth mode of the invention wherein the printout processing is changed when a trouble occurs during the printout processing in accordance with the order of priority of the invention.
Figure 17:
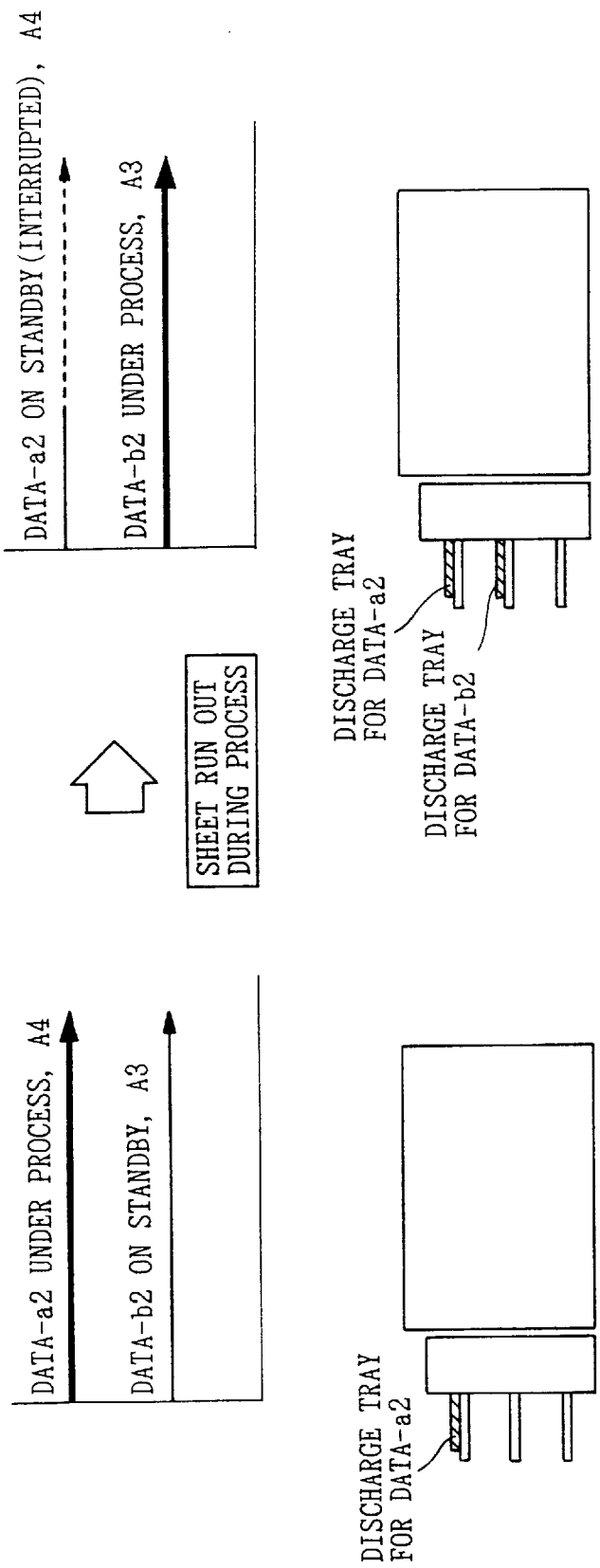
FIG. 17 is a timing chart illustrating a sheet discharging process after the printout processing of FIG. 16.

Assuming that the printout of external data a2 is effected on the basis of the order of priority on the respective external data a2 through d2 set as shown in FIG. 16, during which process A4 sheets run out so that the printing operation of the printer section 3 are temporarily suspended for the replenishment of A4 sheets. The operating efficiency of the printer section 3 will be decreased by suspending the printer section to the time when the replenishment is completed. Therefore, data having conditions executable by the digital copying machine 1 is selected from the other external data b2 through d2. If, for example, the other sheet feeding cassette 34a or 34b contains A3 sheets, then the external data b2 having executable conditions is moved up and given a priority to be selected. Then, the printout of the external data b2 is effected in succession, which process is as described above.

Upon the completion of the replenishment of A4 sheets used for the preceding printout processing, the CPU 44 detects this to enable the printing operation on A4 sheets. At this time, the external data a2 becomes executable so that the printout of the remaining external data a2 after the interruption is restarted. To allow the restart, the printout of the external data b2 is temporarily interrupted. The rest of the external data b2 will be printed in succession to the completion of the printout of the external data a2. By means of the processing described above, the decrease in the operating efficiency of the printer section 3 can be minimized.

At this stage, a need exists for separating the printouts of the external data a2 from those of the external data b2. For this purpose, discrete discharge trays are provided such that the printouts of the external data a2, the process of which was interrupted upon detection of the occurrence of trouble, may be discharged separately from the printouts of the succeeding external data b2. Thus, when the interrupted printout of the external data a2 is restarted, the printouts of the external data a2 may be readily separated from those of the moved-up external data b2, and hence the workability is increased.

The above operation is carried out when desired sheets run out in the course of printout processing, but a similar operation is performed when staples run out in the course of stapling process.

Tenth Mode of the Invention

According to the modes of the invention described above, the printout processing is effected according to a set order of priority. However, there may occur a case in which the external data given a lower priority is not subject to the printout processing however long they may wait. In the case where an order of priority among a plurality of external data from the respective external terminals is reset each time new external data is received, the external data having a lower priority is more apt to descend the order at each receipt of the new external data, thus waiting longer and longer until the data is subject to the printout processing.

Figure 18:
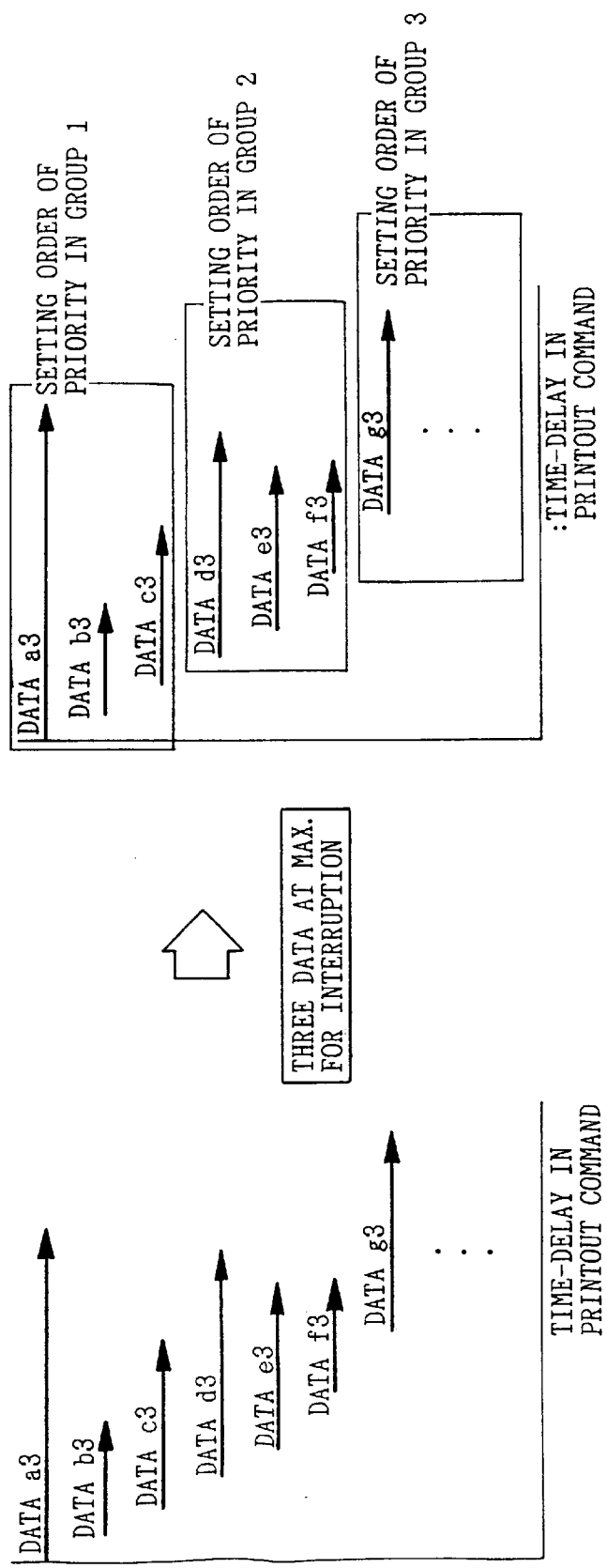
FIG. 18 is a timing chart of a tenth mode of the invention showing another example of setting an order of priority.
Figure 19:
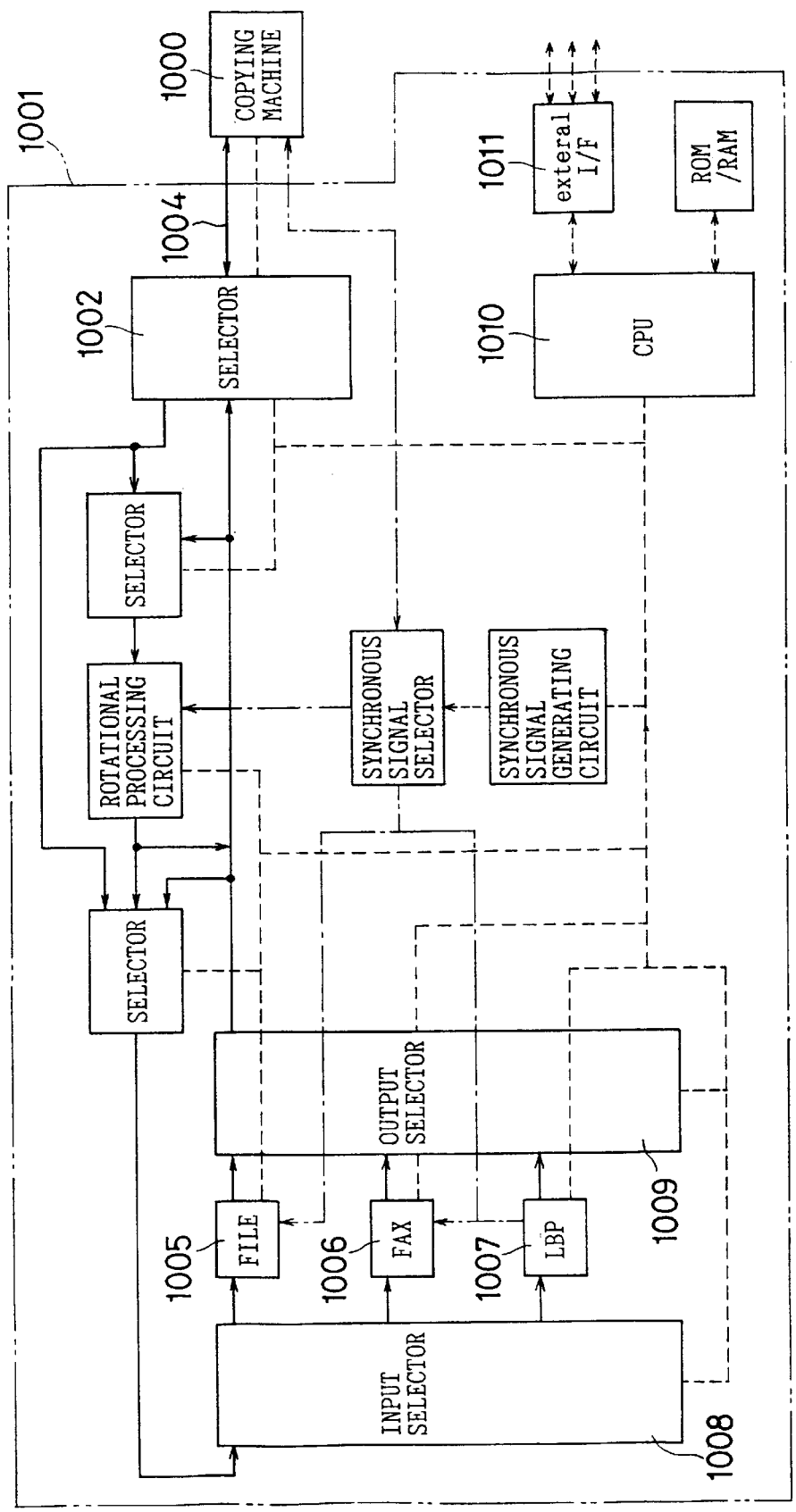
FIG. 19 is a block diagram for illustrating an arrangement of an image forming apparatus of the prior art.

To avoid such a disadvantage, the external data is grouped in the order of receipt thereof so that the priority may be assigned to the respective external data of each group, thereby increasing the operating efficiency of the printer section 3. FIG. 18 illustrates an example thereof.

Referring to FIG. 18, provided that external data a3 through g3 transferred from external terminals is received in the order named, the external data is divided into groups of three external data, respectively. More specifically, the external data is sequentially grouped in the order of receipt thereof so as to form a first group of the external data a3, b3 and c3, a second group of the external data d3, e3 and f3, and a third group of the external data g3 and such.

Then, the order of priority is set in each group. In the first group, for example, the order of priority is set among the external data a3 through c3. In this case, the top priority is given to data requiring the longest processing time from expanding the external data into bit data which can be printed by the printer section 3 to the completion of the printout at the printer section 3, as described with reference to the above modes of the invention. If the length of the processing time is in the order of a3–c3–b3, then the priority is assigned in this order. As to the second group of the external data d3 through f3, the same procedure is taken for setting the order of priority.

Out of the above groups, the first group received earliest is first subject to the printout processing. Accordingly, even if the external data b3 is to be given a lower priority than external data of the other groups, the external data b3 does not wait so long to be printed because the printout of the other group is not started till all the external data of the first group has been printed. Since the order of priority is set on the basis of a group of three data, it is impossible for external data transferred later to move up into the first group.

Accordingly, the problem that there is the external data kept left off and taking such a long time to be printed can be solved without substantially decreasing the operating efficiency of the printer section 3. In this case, as described with reference to the eighth mode of the invention, it is certainly possible to change the set order of priority through a manual operation when it is desired to print out the external data of another group. In this case, each group is displayed to select the external data which is to be printed in priority whereby upon the completion of the printout of external data x in process, the desired external data can be printed regardless of the grouping.

It should be appreciated that the number of data forming the group is not limited to three but any number not smaller than two is possible. Incidentally, it is preferable to set such a number to less than ten because in the group of more than ten data, some data may take a long time to be printed out although the data is received relatively earlier.

The invention may be embodied in other specific forms without departing from the spirit and essential characteristics thereof. The present embodiments are therefore to be considered in all respect as illustrative and not restrictive, the scope of the invention being indicated by the appended claims rather than by the foregoing description and all changes which come within the meaning and the range of equivalency of the claims are therefore intended to be embraced therein.

What is claimed is:

1. An image forming apparatus for printing external data from external devices received via external terminals and for printing copy data, the apparatus comprising:

means for printing the external data and the copy data on a printing medium;

means for suspending operation for printing copy data of the printing means for a period of time;

control means for identifying a start of a time period for actuating the printing means for printing the external data on the printing medium based on priority of printing of the external data including priority determined during total operation of the apparatus including the time period.

2. The image forming apparatus of claim 1, wherein the image forming apparatus includes discharge means for separating the printing medium containing the copy data recorded therein from printing medium containing the external data therein, so that the printing medium is placed in different discharge trays.

3. The image forming apparatus of claim 1, the apparatus further comprising image processing means for image-processing data read by a reading means to provide the copy data;

wherein a document can be arranged at a reading position of the reading means either manually or automatically, and wherein the suspending operation time period is at least one of the following time periods, a time period required for replenishing printing medium, a time period required for changing documents when a plurality of documents are sequentially arranged at the reading position by hand, a time period required for reading an image of a document and image processing the data thus read, a time period required for removing troubles occurring in the reading means, and a time period required for removing troubles occurring in the transport of a document when the document is automatically fed to the reading position.

4. The image forming apparatus of claim 1, wherein a plurality of types of printing medium containing data to be recorded thereon are provided, external data is accompanied by a condition data indicating the printing condition of the external data transferred from an external terminal means for receiving external data and the condition of the data from an external terminal during a sequence of the printing operations; and control means for detecting the start time of a suspended time period required for replenishing printing medium which have run out, so as to make the printing means execute the operation of printing the transferred external data at the start time thus detected when a type of printing medium specified by the transferred condition data differs from the type of printing medium having run out.

5. The image forming apparatus of claim 1, wherein the control means detects the completion of a time period of the suspended operation to cause the printing means to restart the operation of printing the copy data instead of an operation of printing the external data.

6. The image forming apparatus of claim 1, wherein the control means causes the printing means to restart the printout of the copy data upon the completion of the printout of the external data.

7. The image forming apparatus of claim 1, wherein a plurality of the external terminals are provided for transferring the external data accompanied by condition data indicating printing conditions of the external data, and when the plurality of external terminals transfer the respective external data and the condition data during a sequence of the printing operations, the control means selects from the condition data thus transferred, the condition data coinciding with the printing condition set in the image forming apparatus so as to cause the printing means to give priority to execute the printout of the external data associated with the condition data thus selected.

8. The image forming apparatus of claim 7, wherein a printing condition set in the image forming apparatus specifies a size of printing medium which can be processed by the image forming apparatus.

9. The image forming apparatus of claim 7, wherein the image forming apparatus further includes, output means for outputting information directive of changing a printing condition set in the image forming apparatus when some of the condition data does not coincide with the printing condition set in the image forming apparatus.

10. An image forming apparatus for use in connection with a plurality of external terminals for transferring external data to be printed and condition data representative of a printing condition of the external data and for printing copy data, the apparatus comprising:

reading means for reading an image of a document at a predetermined reading position;

printing means for printing the data read by the reading means as copy data on a sheet, and for printing the external data transferred from the external terminal on a sheet;

memory means for sequentially storing the external data transferred from the plurality of external terminals;

selecting means for selecting the external data having condition data which coincides with printing condition set in the image forming apparatus when the external data stored in the memory means is printed;

priority setting means for setting an order of printing the external data selected by the selecting means on the basis of a predetermined order of priority, and control means for causing the printing means to execute the printout of the external data stored in the memory means in accordance with the order of priority set by the priority setting means.

11. The imaging forming apparatus of claim 10, wherein the priority setting means gives a higher priority to external data requiring the longest processing time.

12. The image forming apparatus of claim 10, wherein when new external data is transferred from another external terminal during the printing operations on the basis of the order of priority, the priority setting means reassigns priorities to the new external data and the other external data yet to be printed to reset the order of priority.

13. The image forming apparatus of claim 10, wherein when the printing operation of the printing means is interrupted owing to the occurrence of trouble of a printing condition, the control means causes the printing means to execute in succession the printout of external data having a printing condition different from and a priority lower than the printout of interrupted external data.

14. The image forming apparatus of claim 10, wherein the control means causes the printing means to execute the printout of external data stored in the memory means according to the order of priority set by the priority setting means and to execute the printing operation under a condition most closely related to the printing condition of the condition data.

15. An image forming apparatus for use in connection with a plurality of external terminals, the apparatus comprising:

reading means for reading an image of a document at a predetermined reading position;

printing means for printing the data read by the reading means as copy data on a sheet and for printing the external data transferred from the external terminals on a sheet;

memory means for sequentially storing the external data transferred from the plurality of external terminals, dividing means for dividing the external data from the plurality of external terminals into groups of a predetermined number in the order of the receipt thereof, selecting means for selecting external data having the condition data which coincides with a printing condition set in the image forming apparatus when the external data stored in the memory means is printed, priority setting means for setting a printing order of the external data grouped by the dividing means based on a predetermined order of priority, and control means causing the printing means to execute the printing operation for each group of the external data stored in the memory means in accordance with the order of priority.

16. The image forming apparatus of claim 15, wherein the image forming apparatus further comprises priority order changing means for providing an arbitrary change of an order of priority as required.

* * * * *